United States Patent
Choi et al.

(10) Patent No.: US 12,506,849 B2
(45) Date of Patent: Dec. 23, 2025

(54) ELECTRONIC APPARATUS AND CONTROLLING METHOD THEREOF

(71) Applicant: Samsung Electronics Co., Ltd., Suwon-si (KR)

(72) Inventors: Yeeun Choi, Suwon-si (KR); Songil Lee, Suwon-si (KR); Donghee Kang, Suwon-si (KR); Juyeon Lee, Suwon-si (KR); Jiwoong Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/828,619

(22) Filed: Sep. 9, 2024

(65) Prior Publication Data
US 2025/0142032 A1    May 1, 2025

Related U.S. Application Data

(63) Continuation of application No. PCT/KR2024/012002, filed on Aug. 12, 2024.

(30) Foreign Application Priority Data

Nov. 1, 2023  (KR) .......................... 10-2023-0149235

(51) Int. Cl.
*H04N 9/31* (2006.01)

(52) U.S. Cl.
CPC .......... *H04N 9/3182* (2013.01); *H04N 9/3167* (2013.01); *H04N 9/3185* (2013.01)

(58) Field of Classification Search
CPC ...... H04N 9/3182; H04N 9/31; H04N 9/3167; H04N 9/3185; H04N 5/74; H04N 9/64;
(Continued)

(56) References Cited

U.S. PATENT DOCUMENTS

| 7,339,596 B2 | 3/2008 | Tajima |
| 7,813,578 B2 | 10/2010 | Park et al. |

(Continued)

FOREIGN PATENT DOCUMENTS

| CN | 106559658 B | 8/2017 |
| CN | 113542705 B | 6/2023 |

(Continued)

OTHER PUBLICATIONS

Lee et al., Suggestion of Multi-Electrode Type Electronic Paper Film to Can be Used as a Transparent Display, J. Korean Inst. Electr. Electron. Mater. Eng., vol. 32, No. 4, pp. 296-301, Jul. 2019.

International Search Report and written opinion dated Nov. 22, 2024, issued in International Application No. PCT/KR2024/012002.

*Primary Examiner* — Sherrie Hsia
(74) *Attorney, Agent, or Firm* — Jefferson IP Law, LLP

(57) ABSTRACT

An electronic apparatus is provided. The electronic apparatus includes memory, a projection part, a sensor part, an optical shutter part, and at least one processor, and the at least one processor is configured to output, through the projection part, a first projection image at a projection surface, obtain, through the sensor part, first sensing data associated with the projection surface, obtain a second projection image by performing a correction function on the first projection image based on the first sensing data, identify a position of a background area from the first projection image, identify a position of a blocking area corresponding to the position of the background area, control the optical shutter part to perform a filtering function based on the position of the blocking area, and output, through the projection part, the second projection image.

20 Claims, 30 Drawing Sheets

(58) Field of Classification Search
CPC ........ H04N 21/431; G06T 5/20; G03B 17/54; G03B 21/00
USPC ........ 348/744–747, 806, 807; 353/121, 122; 345/207, 697
See application file for complete search history.

(56) References Cited

U.S. PATENT DOCUMENTS

| | | |
|---|---|---|
| 7,905,606 B2 | 3/2011 | Bullock |
| 8,125,558 B2 * | 2/2012 | Davis .................. H04N 9/3108 348/744 |
| 10,235,788 B2 | 3/2019 | Tinsman |
| 10,929,078 B2 | 2/2021 | Hwang et al. |
| 2016/0037143 A1 | 2/2016 | Yang |

FOREIGN PATENT DOCUMENTS

| | | |
|---|---|---|
| CN | 116320334 A | 6/2023 |
| JP | 2003-333611 A | 11/2003 |
| JP | 2008-028531 A | 2/2008 |
| JP | 6464968 B2 | 2/2019 |
| KR | 10-2011-0120630 A | 11/2011 |
| KR | 10-2017-0094943 A | 8/2017 |
| KR | 10-2017-0107674 A | 9/2017 |
| KR | 10-2019-0083603 A | 7/2019 |

* cited by examiner

FIG. 5
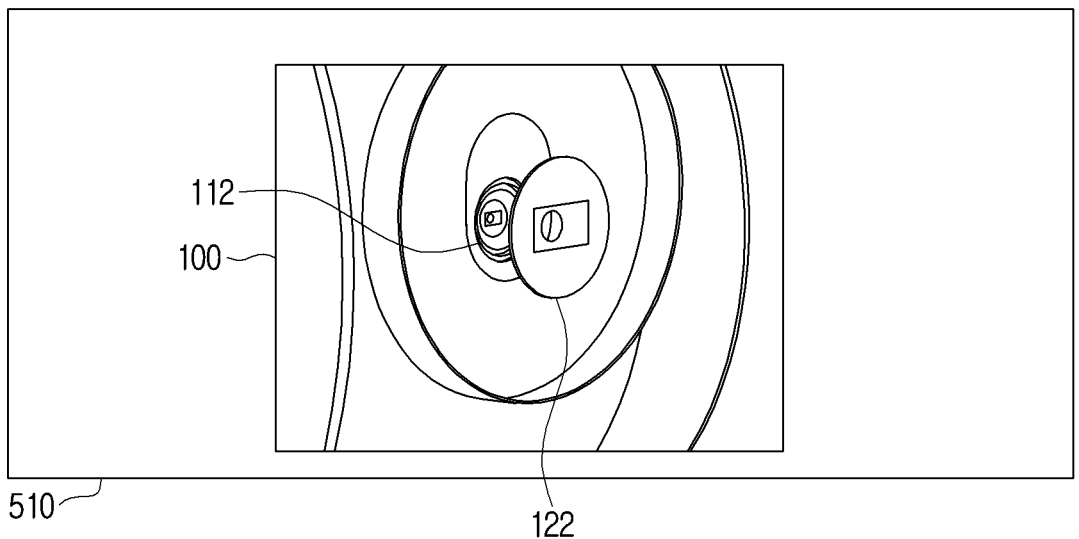
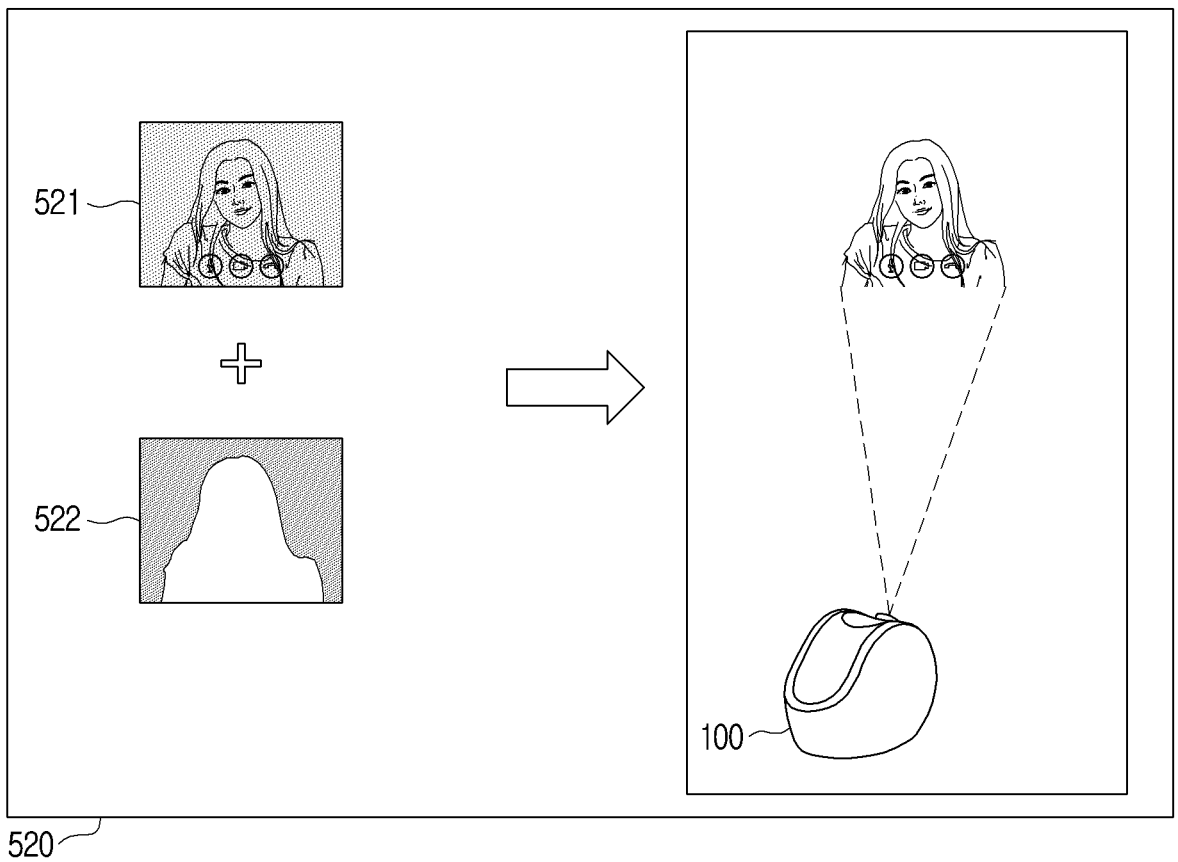

FIG. 7
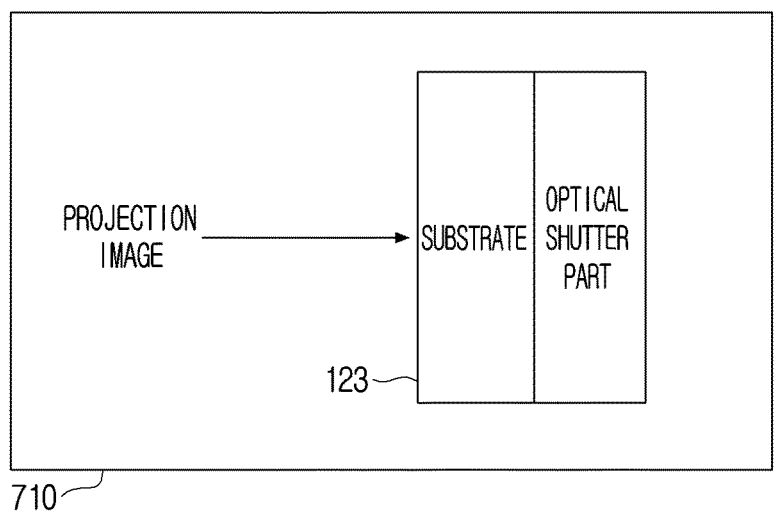
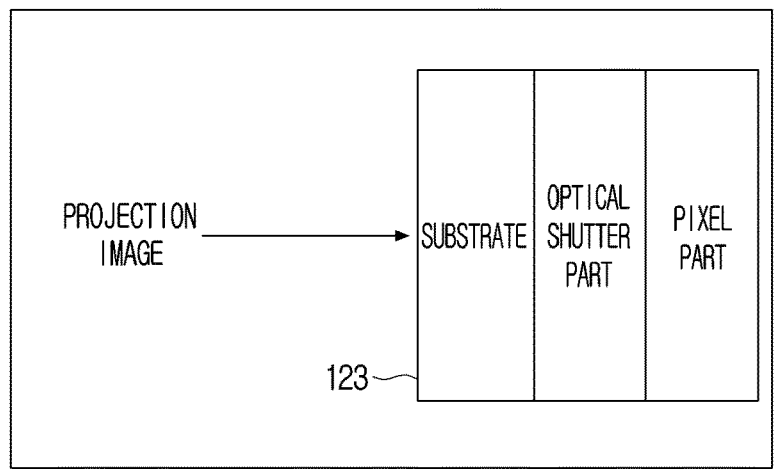
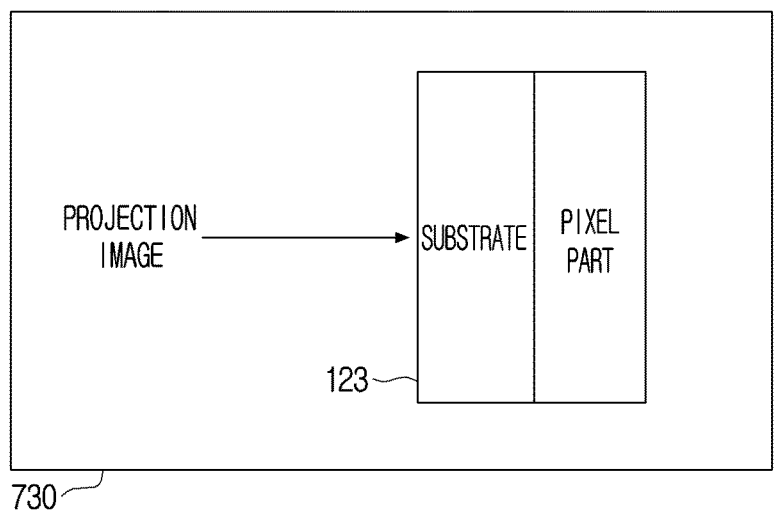

FIG. 10

| # | CONTENT TYPE | EXAMPLE | DESCRIPTION | CONTENT CHARACTERISTIC AND FILTERING FUNCTION |
|---|---|---|---|---|
| 1 | VIEWING CONTENT |  | PROVIDING APPLICATION META INFORMATION: CINEMA/DRAMA/ ADVERTISEMENT ETC. | PRESENCE OR ABSENCE OF BOUNDARY IN BACKGROUND AREA NOT BEING IMPORTANT<br>→ FILTERING FUNCTION X<br>(TRANSMITTANCE 100%) |
| 2 | STRUCTURED CONTENT |  | WIDGET, AI INTERFACE, AVATAR, POP-UP MESSAGE, ALARM ETC. | SHAPE, SIZE, POSITION ARE FIXED<br>→ FILTERING FUNCTION O<br>(TRANSMITTANCE 50%) |
| 3 | UNSTRUCTURED CONTENT | 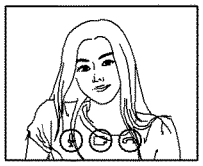 | MOVING AREA IN REAL-TIME (E.G., VIDEO CALL) | SHAPE, SIZE, POSITION ARE CHANGED<br>→ FILTERING FUNCTION O<br>(TRANSMITTANCE 0%)<br>(REAL-TIME TRACKING) |
| 4 | MULTIPLE CONTENT | 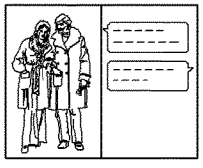 | PROVIDING ANOTHER CONTENT WHILE VIEWING CONTENT | PLURALITY OF CONTENT OUTPUT<br>→ FILTERING FUNCTION O<br>(TRANSMITTANCE 0%)<br>(DETERMINING WHETHER FILTERING IS APPLIED FOR EACH CONTENT) |
| 5 | BACKGROUND SEPARATED CONTENT | 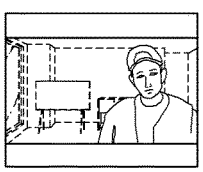 | REMOVE BACKGROUND WHEN VIDEO CALLING<br>SYNTHESIZE BACKGROUND WHEN VIDEO CALLING | TARGET AREA/BACKGROUND AREA SEPARATED<br>→ FILTERING FUNCTION O<br>(TRANSMITTANCE 0%)<br>(APPLYING FILTERING TO ONLY BACKGROUND AREA) |

1000

FIG. 18
1810
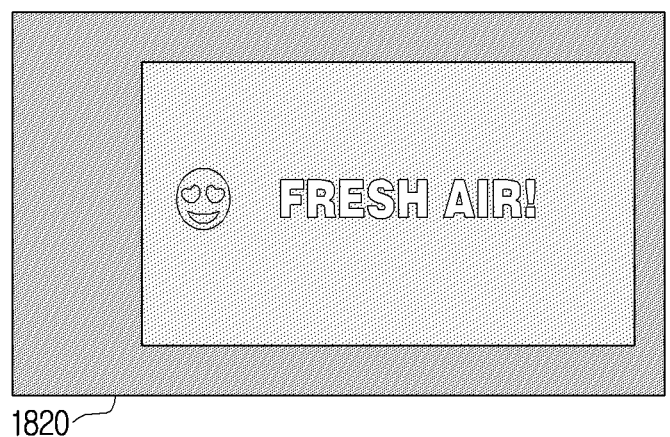
1820
1830

FIG. 19
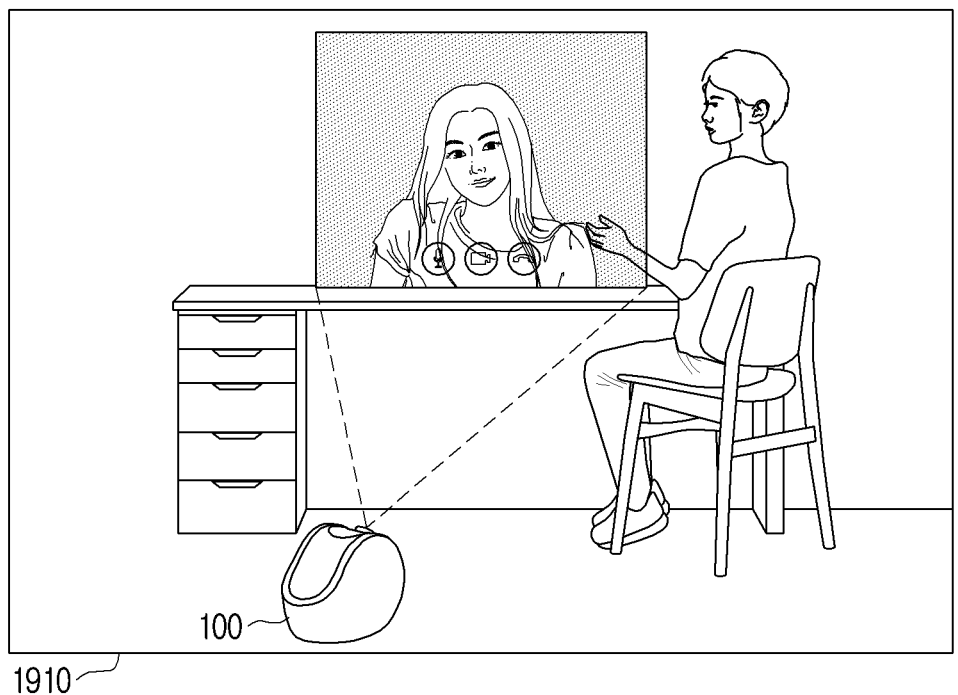
1910
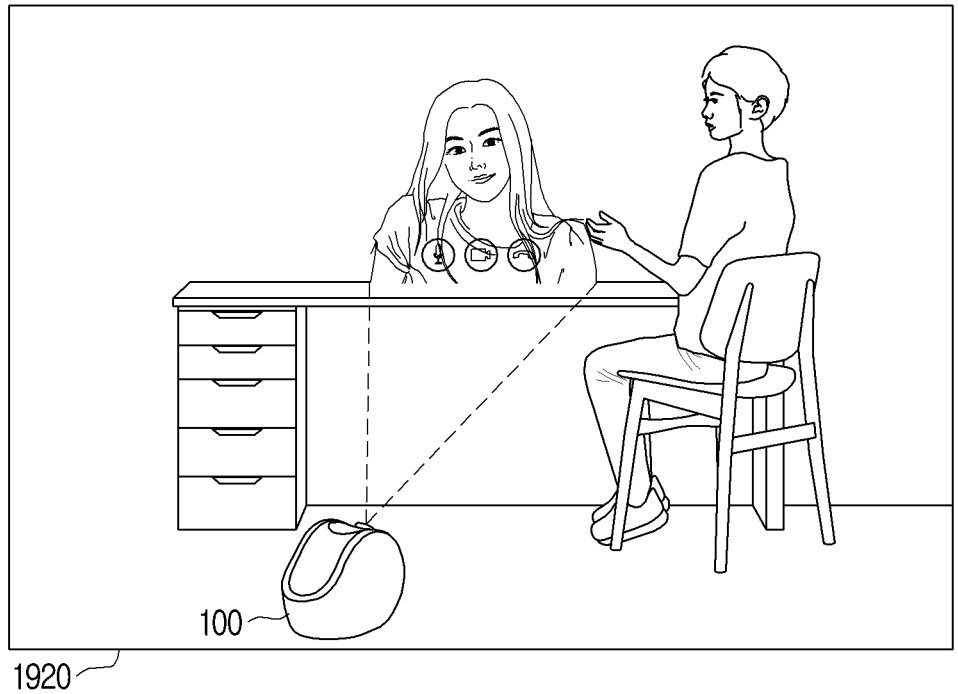
1920

FIG. 20
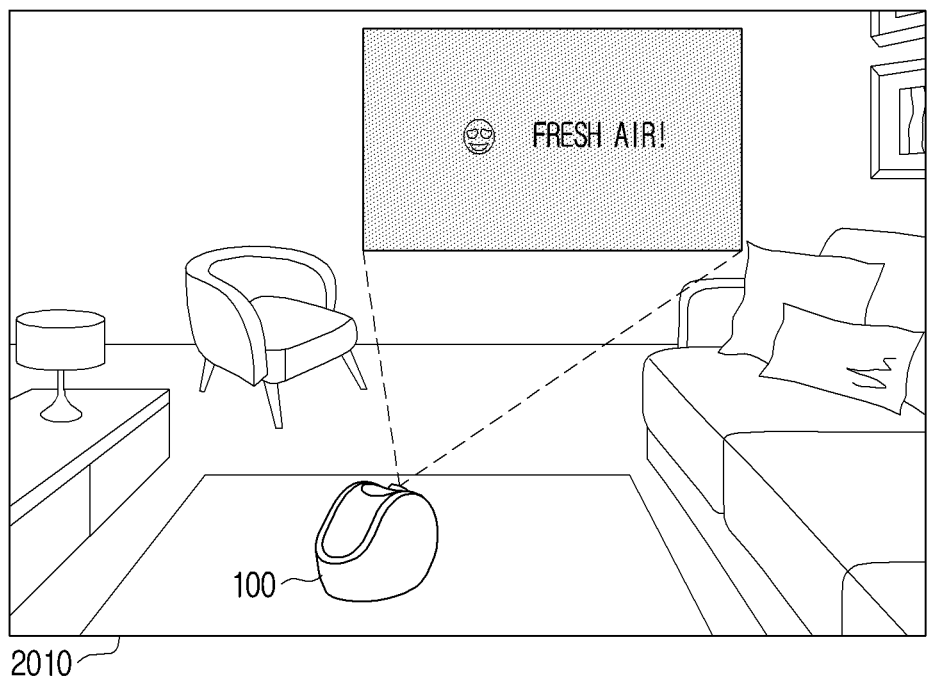
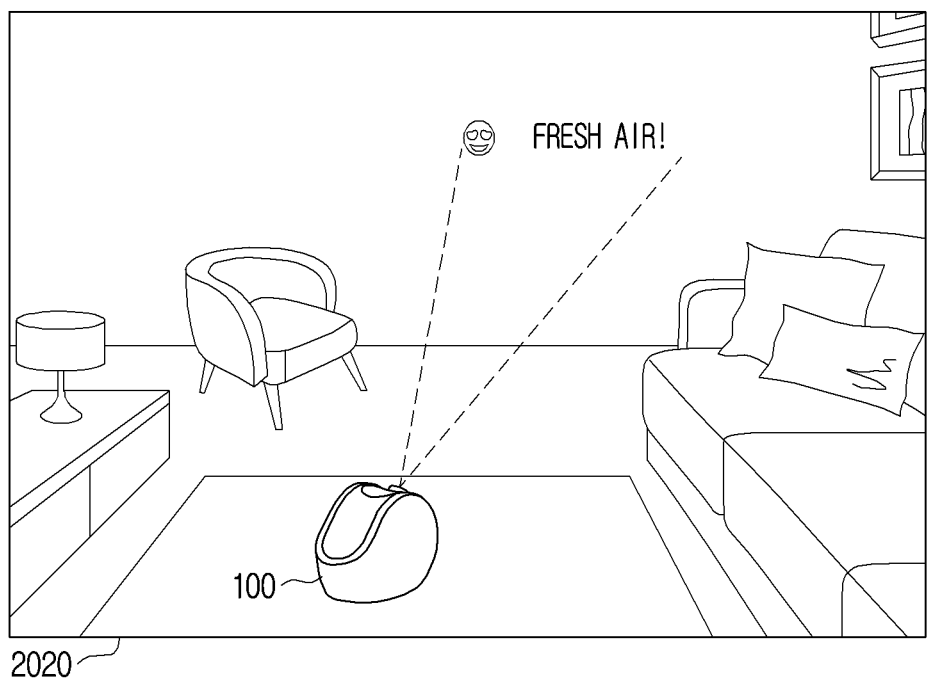

FIG. 21
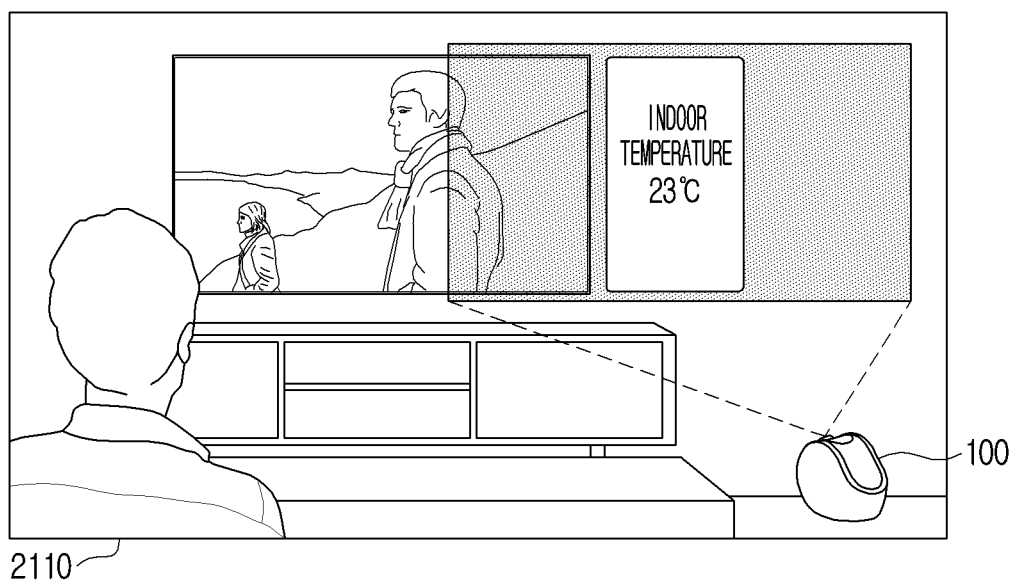
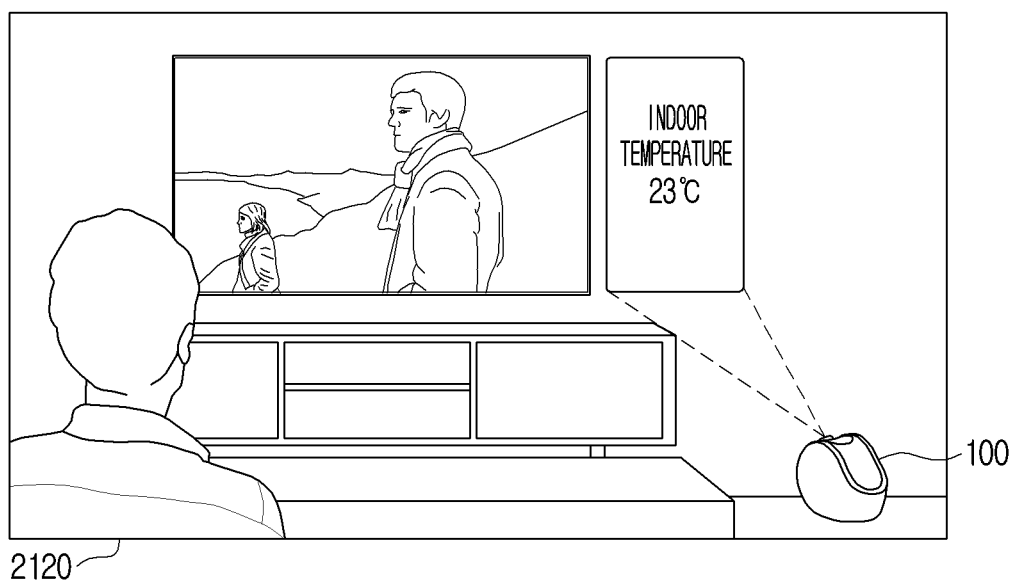

FIG. 22
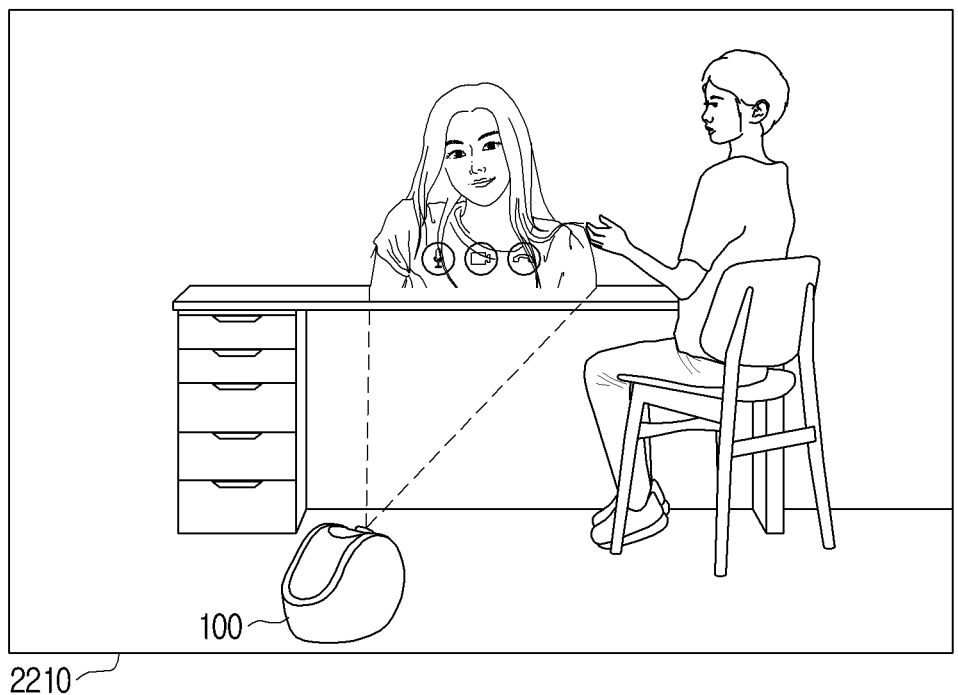
2210
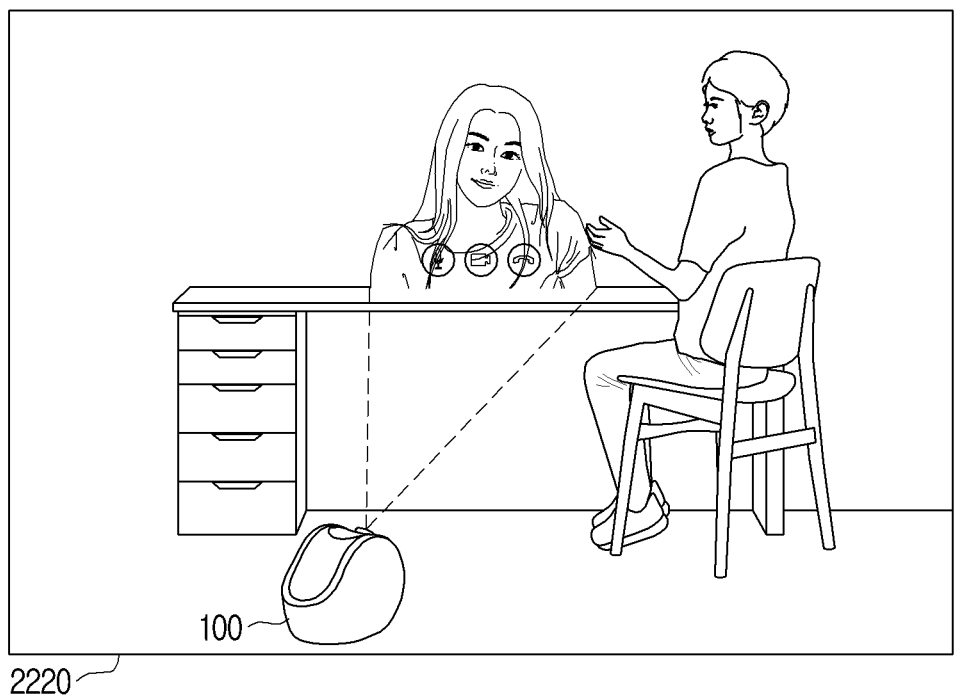
2220

FIG. 23
IMAGE SIZE : 1470 * 750
2310
⇩
Y COORDINATE (START) : 210
X COORDINATE (START) : 280
X COORDINATE (END) : 1350
2320
Y COORDINATE (END) : 600
⇩
CROPPING CROP IMAGE ELEMENT STARTING POINT/
END POINT OF X AND Y AXES
2330
⇩
2340

FIG. 25
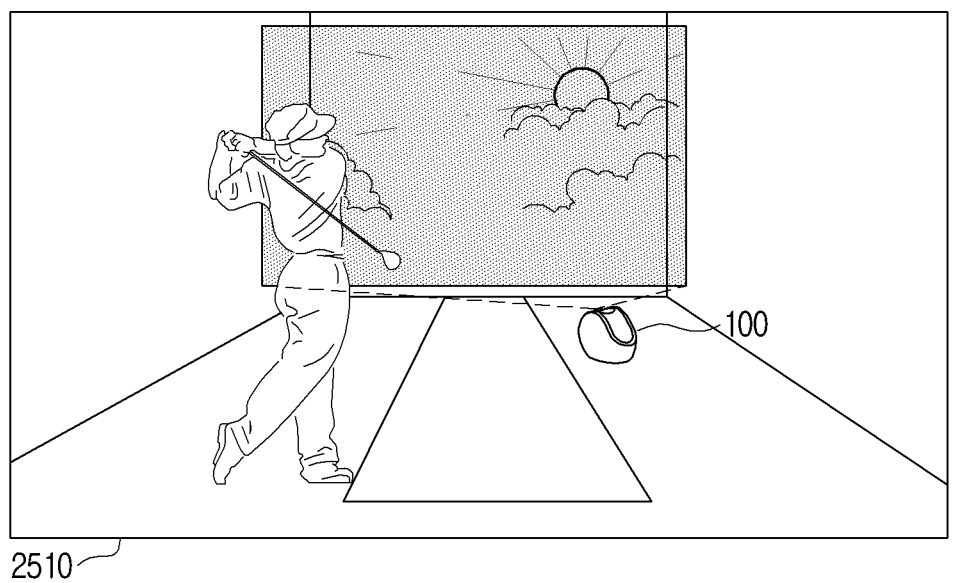
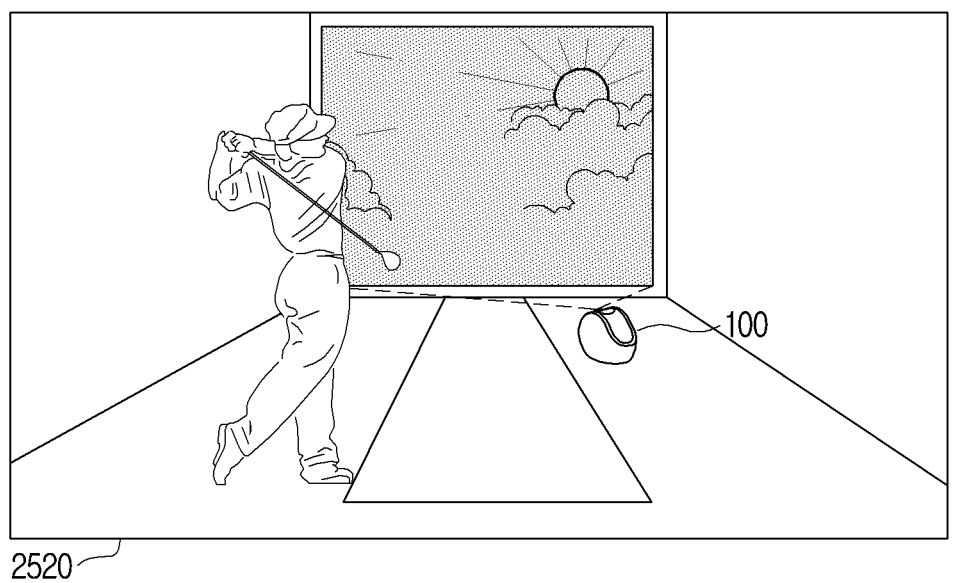

FIG. 26
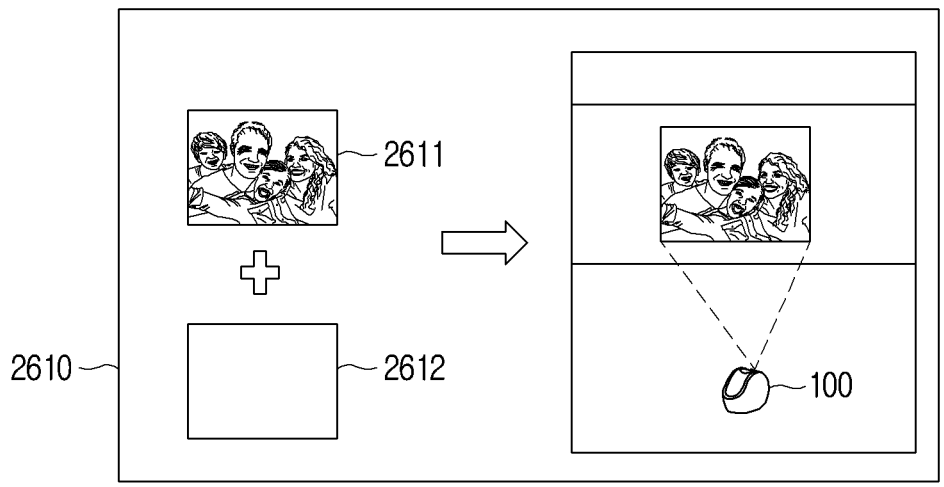
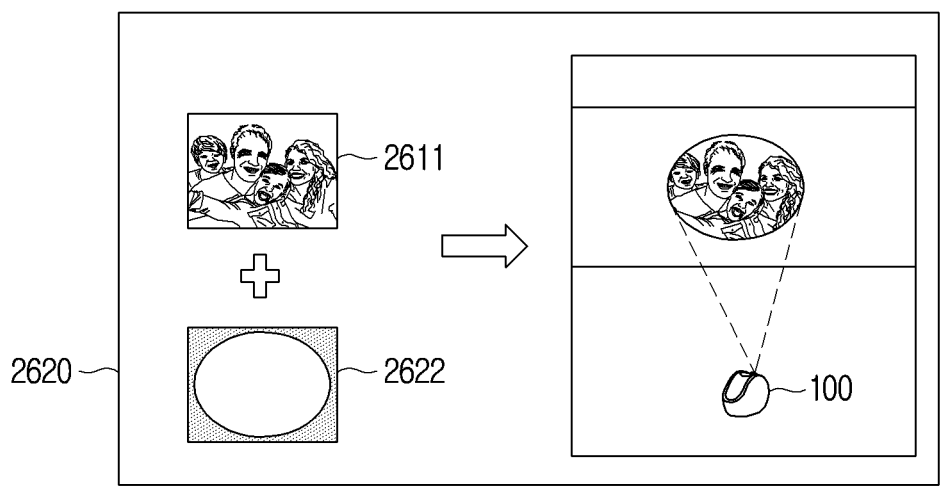
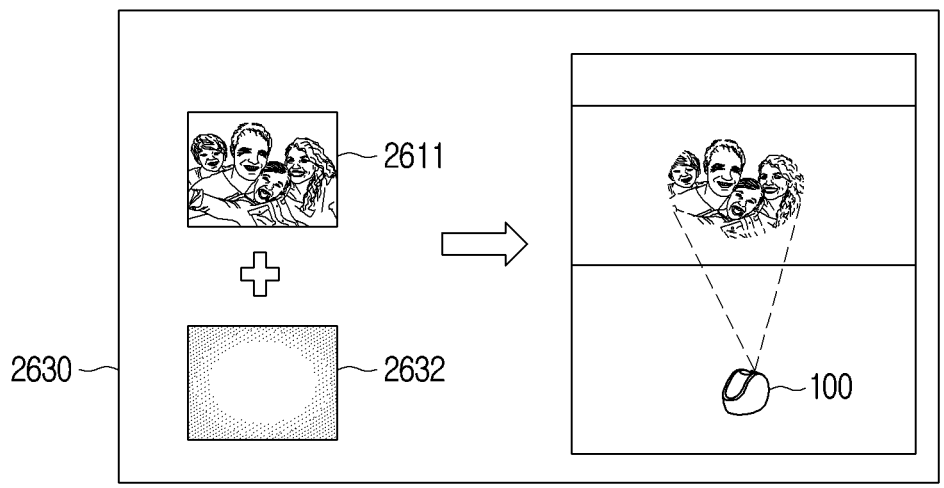

FIG. 28
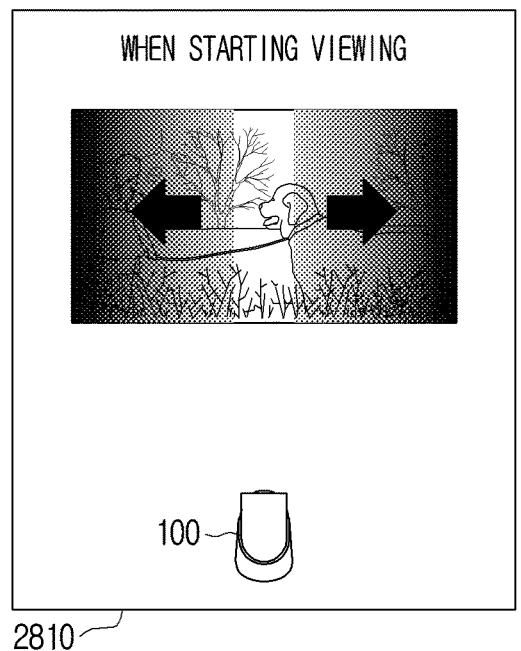
2810
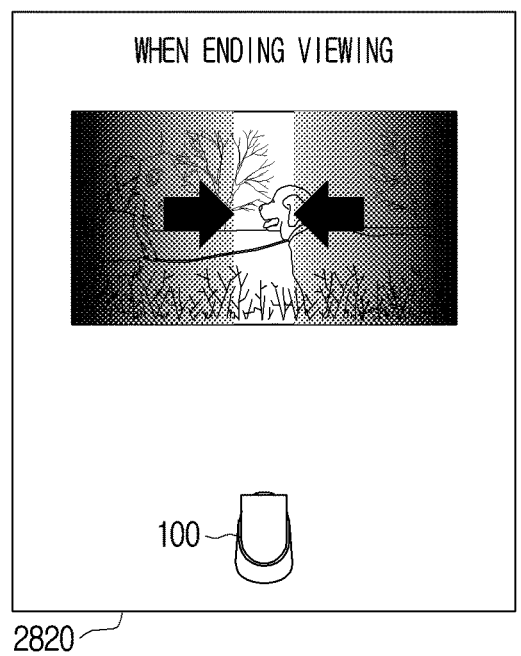
2820

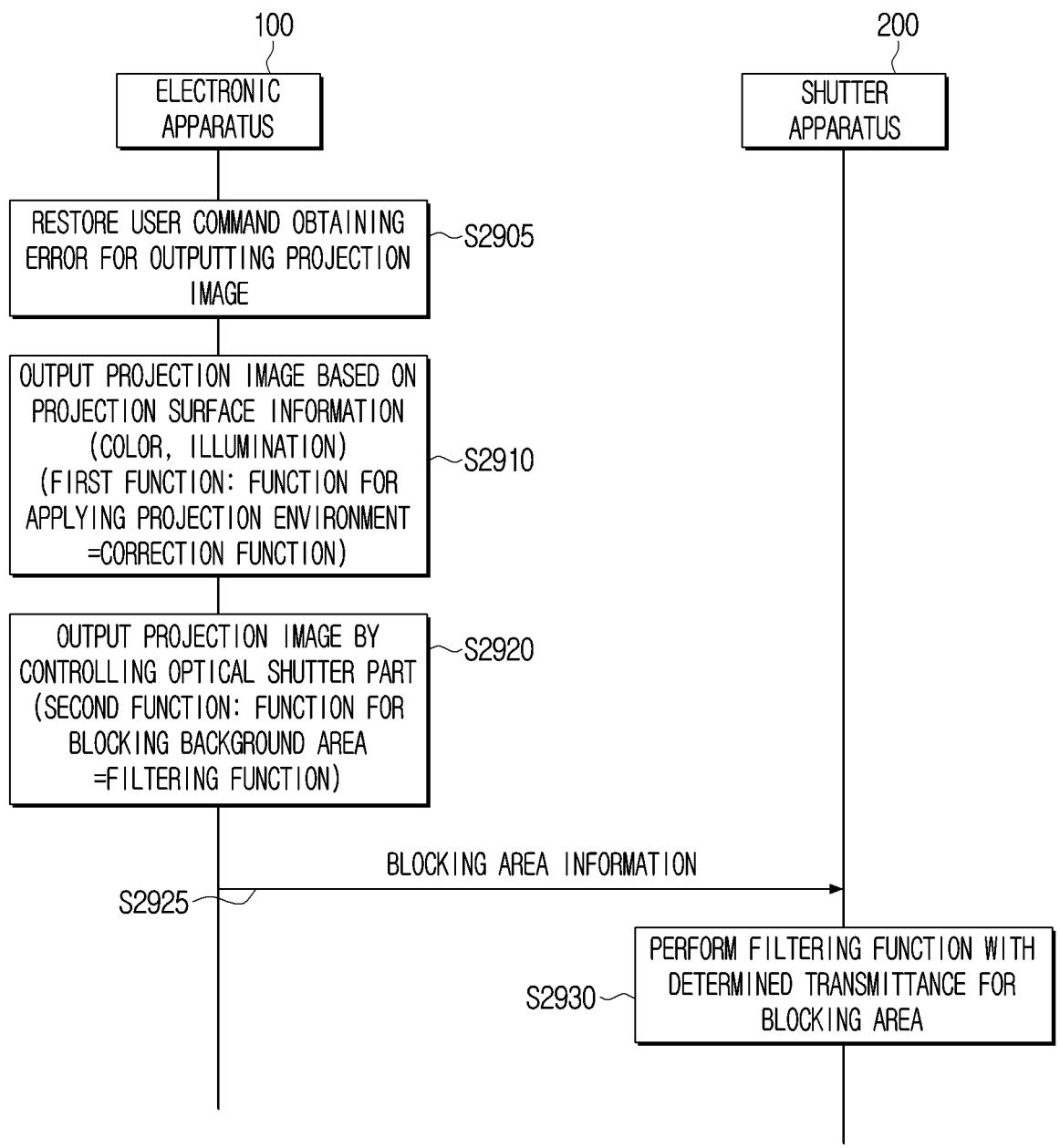

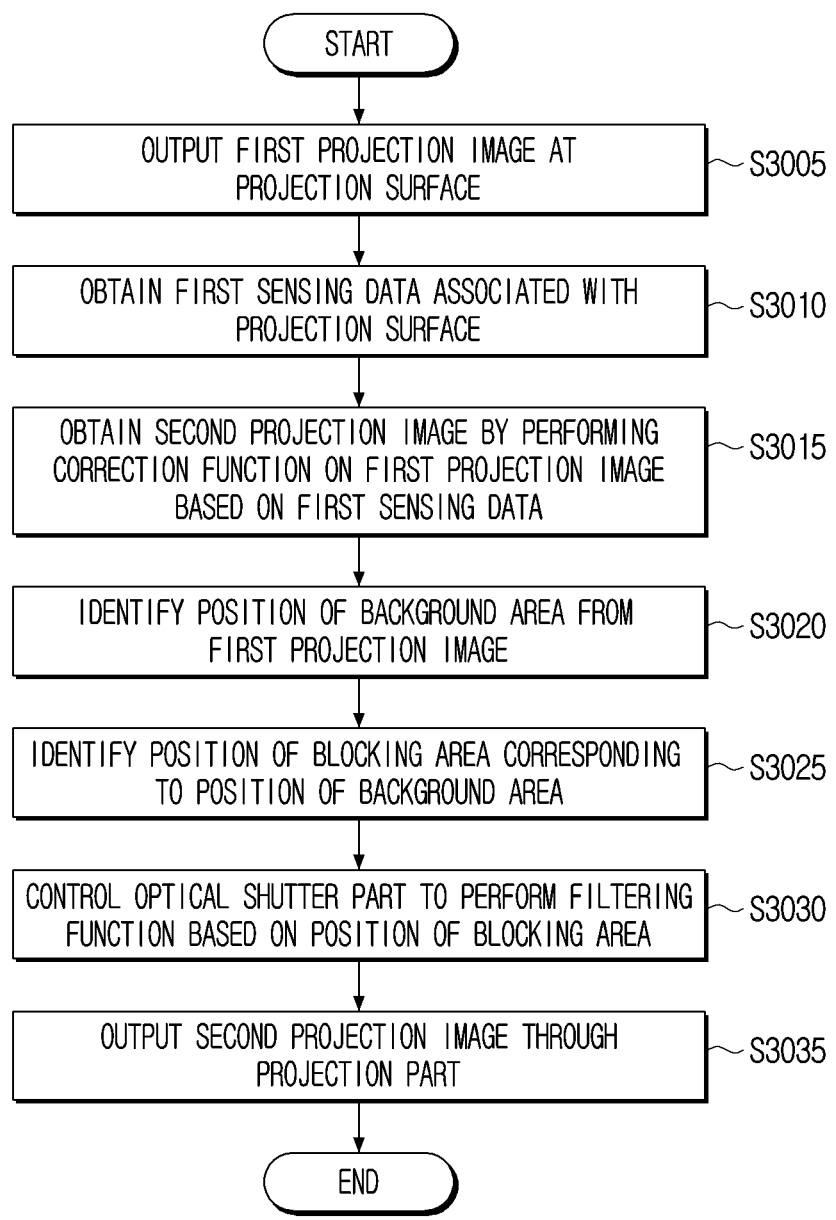

ELECTRONIC APPARATUS AND CONTROLLING METHOD THEREOF

CROSS-REFERENCE TO RELATED APPLICATION(S)

This application is a continuation application, claiming priority under § 365 (c), of an International application No. PCT/KR2024/012002, filed on Aug. 12, 2024, which is based on and claims the benefit of a Korean patent application number 10-2023-0149235, filed on Nov. 1, 2023, in the Korean Intellectual Property Office, the disclosure of which is incorporated by reference herein in its entirety.

TECHNICAL FIELD

The disclosure relates to an electronic apparatus and a controlling method thereof. More particularly, the disclosure relates to an electronic apparatus that performs filtering of a portion of an area of a projection image and a controlling method thereof.

BACKGROUND ART

If a projector outputs a projection image at a projection surface, various correction functions may be performed. In addition to a keystone correction according to a projection angle of the projector, a resolution, brightness, color, and the like of the projection image may be changed.

There may be cases in which an output of the projection image is obstructed by a surrounding environment. For example, if an obstacle is present at the projection surface or a projection environment is too bright, a correction of the projection image may be necessary because the projection image is not be normally output.

The projector may correct the projection image taking into consideration the surrounding environment. The projector may perform a correction function of removing a background portion of the projection image or changing a color of the background portion taking into consideration the surrounding environment.

Even if the background portion is removed, because light is projected to a position corresponding to the background portion, an area or a boundary of the background portion is still exposed to a user according to ambient illumination and there is a problem of a sense of immersion (or engagement) decreasing for the user when viewing key information and experiencing inconvenience.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic apparatus that controls for a background area to not be output at a projection surface by filtering a portion from among a projected image and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes memory storing one or more computer programs, a projection part, a sensor part, an optical shutter part, and one or more processors communicatively coupled to the memory, the projection part, the sensor part, and the optical shutter part, wherein the one or more computer programs include computer-executable instructions that, when executed by the one or more processors individually or collectively, cause the electronic apparatus to output, through the projection part, a first projection image at a projection surface, obtain, through the sensor part, first sensing data associated with the projection surface, obtain a second projection image by performing a correction function on the first projection image based on the first sensing data, identify a position of a background area from the first projection image, identify a position of a blocking area corresponding to the position of the background area, control the optical shutter part to perform a filtering function based on the position of the blocking area, and output, through the projection part, the second projection image.

The background area is a second background area, and the one or more computer programs further include computer-executable instructions that, when executed by the one or more processors individually or collectively, cause the electronic apparatus to obtain a color value of a first background area and a color value of a projection surface area based on the first sensing data, and perform the correction function on the first projection image based on a difference value of the color value of the first background area and the color value of the projection surface area.

The one or more computer programs further include computer-executable instructions that, when executed by the one or more processors individually or collectively, cause the electronic apparatus to, based on the difference value being greater than or equal to a threshold value, identify the second background area from the first projection image, determine a color value of the second background area based on the color value of the first background area and the color value of the projection surface area, and obtain the second projection image by performing the correction function based on the color value of the second background area.

The one or more computer programs further include computer-executable instructions that, when executed by the one or more processors individually or collectively, cause the electronic apparatus to perform the correction function a plurality of times.

The background area is a second background area, and the one or more computer programs further include computer-executable instructions that, when executed by the one or more processors individually or collectively, cause the electronic apparatus to obtain, through the sensor part, second sensing data associated with the projection surface, obtain an illumination value of a first background area and an illumination value of a projection surface area based on the second sensing data, obtain a difference value of the illumination value of the first background area and the illumination value of the projection surface area, based on the difference value being greater than or equal to a threshold value, identify the second background area from the first projection image, determine a brightness value of the second background area based on the illumination value of the first background area and the illumination value of the projection surface area, and obtain the second projection image by performing the correction function based on the brightness value of the second background area.

The one or more computer programs further include computer-executable instructions that, when executed by the one or more processors individually or collectively, cause the electronic apparatus to obtain a transmittance corresponding to the blocking area, and control the optical shutter part to perform the filtering function based on the position of the blocking area and the transmittance.

The one or more computer programs further include computer-executable instructions that, when executed by the one or more processors individually or collectively, cause the electronic apparatus to store, in the memory, transmittance table information including transmittance per content type, identify a content type of the first projection image, and obtain a transmittance corresponding to the content type based on the transmittance table information.

The one or more computer programs further include computer-executable instructions that, when executed by the one or more processors individually or collectively, cause the electronic apparatus to obtain, through the sensor part, third sensing data, based on a background object being identified from the third sensing data, change the position of the blocking area based on a position of the background object, and control the optical shutter part to perform the filtering function based on a position of the changed blocking area.

The one or more computer programs further include computer-executable instructions that, when executed by the one or more processors individually or collectively, cause the electronic apparatus to receive content including a plurality of projection images, and based on the position of the background area being changed for each of the plurality of projection images, change the position of the blocking area based on a position of the changed background area.

The sensor part includes an image sensor, and the one or more computer programs further include computer-executable instructions that, when executed by the one or more processors individually or collectively, cause the electronic apparatus to obtain, through the image sensor, the first sensing data including a captured image capturing the projection surface.

In accordance with another aspect of the disclosure, a method performed by an electronic apparatus including a projection part and an optical shutter part is provided. The method includes outputting, by the electronic apparatus, a first projection image at a projection surface, obtaining, by the electronic apparatus, first sensing data associated with the projection surface, obtaining, by the electronic apparatus, a second projection image by performing a correction function on the first projection image based on the first sensing data, identifying, by the electronic apparatus, a position of a background area from the first projection image, identifying, by the electronic apparatus, a position of a blocking area corresponding to the position of the background area, controlling, by the electronic apparatus, the optical shutter part to perform a filtering function based on the position of the blocking area, and outputting, by the electronic apparatus through the projection part, the second projection image.

The background area is a second background area, and the obtaining of the second projection image includes obtaining, by the electronic apparatus, a color value of a first background area and a color value of a projection surface area based on the first sensing data, and performing, by the electronic apparatus, the correction function on the first projection image based on a difference value of the color value of the first background area and the color value of the projection surface area.

The obtaining of the second projection image includes, based on the difference value being greater than or equal to a threshold value, identifying, by the electronic apparatus, the second background area from the first projection image, determining, by the electronic apparatus, a color value of the second background area based on the color value of the first background area and the color value of the projection surface area, and obtaining, by the electronic apparatus, the second projection image by performing the correction function based on the color value of the second background area.

The method further includes performing the correction function a plurality of times.

The background area is a second background area, and the obtaining of the second projection image includes obtaining, by the electronic apparatus, second sensing data associated with the projection surface, obtaining, by the electronic apparatus, an illumination value of a first background area and an illumination value of a projection surface area based on the second sensing data, obtaining, by the electronic apparatus, a difference value of the illumination value of the first background area and the illumination value of the projection surface area, based on the difference value being greater than or equal to a threshold value, identifying, by the electronic apparatus, the second background area from the first projection image, determining, by the electronic apparatus, a brightness value of the second background area based on the illumination value of the first background area and the illumination value of the projection surface area, and obtaining, by the electronic apparatus, the second projection image by performing the correction function based on the brightness value of the second background area.

The controlling of the optical shutter part includes obtaining, by the electronic apparatus, a transmittance corresponding to the blocking area, and controlling, by the electronic apparatus, the optical shutter part to perform the filtering function based on the position of the blocking area and the transmittance.

The electronic apparatus stores transmittance table information including transmittance per content type, and the controlling of the optical shutter part includes identifying, by the electronic apparatus, a content type of the first projection image, and obtaining, by the electronic apparatus, a transmittance corresponding to the content type based on the transmittance table information.

The method further includes obtaining, by the electronic apparatus, third sensing data, based on a background object being identified from the third sensing data, changing, by the electronic apparatus, the position of the blocking area based on a position of the background object, and controlling, by the electronic apparatus, the optical shutter part to perform the filtering function based on a position of the changed blocking area.

The method further includes receiving, by the electronic apparatus, content including a plurality of projection images, and based on the position of the background area being changed for each of the plurality of projection images, changing, by the electronic apparatus, the position of the blocking area based on a position of the changed background area.

The obtaining of the first sensing data includes obtaining, by the electronic apparatus through an image sensor, the first sensing data including a captured image capturing the projection surface.

One or more non-transitory computer-readable storage media storing one or more computer programs including computer-executable instructions that, when executed by one or more processors of an electronic device individually or collectively, cause the electronic device to perform operations are provided. The operations include outputting, by the electronic apparatus, a first projection image at a projection surface, obtaining, by the electronic apparatus, first sensing data associated with the projection surface, obtaining, by the electronic apparatus, a second projection image by performing a correction function on the first projection image based on the first sensing data, identifying, by the electronic apparatus, a position of a background area from the first projection image, identifying, by the electronic apparatus, a position of a blocking area corresponding to the position of the background area, controlling, by the electronic apparatus, an optical shutter part of the electronic apparatus to perform a filtering function based on the position of the blocking area, and outputting, by the electronic apparatus through a projection part of the electronic apparatus, the second projection image.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 5 is a diagram illustrating a filtering function according to an embodiment of the disclosure;

FIG. 7 is a diagram illustrating an optical shutter part according to an embodiment of the disclosure;

FIG. 10 is a diagram illustrating a content type according to an embodiment of the disclosure;

FIG. 18 is a diagram illustrating an inversion function according to an embodiment of the disclosure;

FIG. 19 is a diagram illustrating a filtering function according to an embodiment of the disclosure;

FIG. 20 is a diagram illustrating a filtering function according to an embodiment of the disclosure;

FIG. 21 is a diagram illustrating a filtering function according to an embodiment of the disclosure;

FIG. 22 is a diagram illustrating an operation of changing a blocking area in real-time according to an embodiment of the disclosure;

FIG. 23 is a diagram illustrating an inversion function according to an embodiment of the disclosure;

FIG. 25 is a diagram illustrating a filtering function according to an embodiment of the disclosure;

FIG. 26 is a diagram illustrating a blocking image according to an embodiment of the disclosure;

FIG. 28 is a diagram illustrating a fade-in effect and a fade-out effect according to an embodiment of the disclosure;

FIG. 29 is a diagram illustrating a system which includes an electronic apparatus and a shutter apparatus according to an embodiment of the disclosure; and FIG. 30 is a diagram illustrating a controlling method of an electronic apparatus according to an embodiment of the disclosure.

The same reference numerals are used to represent the same elements throughout the drawings.

DETAILED DESCRIPTION OF EXEMPLARY EMBODIMENTS

Figure 1:
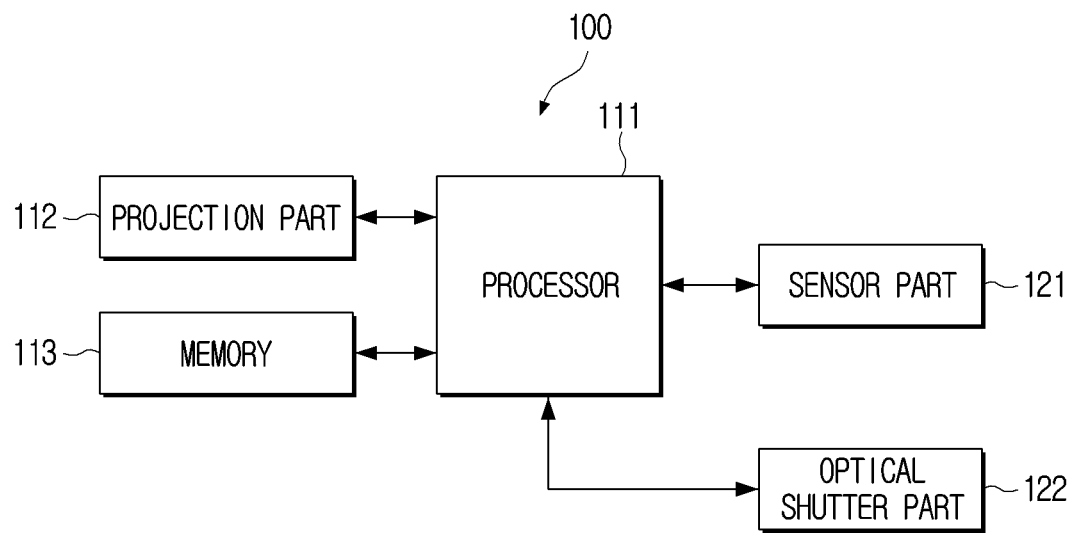
FIG. 1 is a block diagram illustrating an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in describing an embodiment of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in a relevant description. Accordingly, the terms used herein are not to be understood simply as its designation but based on the meaning of the term and the overall context of the disclosure.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B".

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the other element or as being coupled through other element (e.g., a third element).

A singular expression includes a plural expression, unless otherwise clearly specified in a context. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used herein perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor (not shown).

In the disclosure, the term "user" may refer to a person using an electronic apparatus or an apparatus (e.g., an artificial intelligence electronic apparatus) using the electronic apparatus.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic apparatus according to an embodiment of the disclosure.

Referring to FIG. 1, an electronic apparatus 100 may include at least one from among at least one processor 111, a projection part 112, memory 113, a sensor part 121, or an optical shutter part 122.

The electronic apparatus 100 may be implemented as a projector that outputs an image (or content).

The at least one processor 111 may perform an overall control operation of the electronic apparatus 100. Specifically, the at least one processor 111 may function controlling the overall operation of the electronic apparatus 100. Detailed descriptions associated with the at least one processor 111 will be described in FIG. 2.

The projection part 112 may be a configuration that projects an image (projection image, content, etc.) to an outside. Detailed descriptions associated with the projection part 112 will be described in FIG. 3.

The memory 113 may store a projection image projected through the projection part 112. Here, the projection image may mean not only a still image, but also a sequence of images (or a moving image). The projection image may mean an image included in a content.

The sensor part 121 may obtain sensing data. The memory 113 may store a content image. The projection part 112 may be used in outputting an image.

The at least one processor 111 may control an operation performed from the electronic apparatus 100.

The at least one processor 111 may output, through the projection part 112, a first projection image at a projection surface, obtain, through the sensor part 121, first sensing data associated with the projection surface, obtain a second projection image by performing a correction function on the first projection image based on the first sensing data, identify a position of a background area from the first projection image, identify a position of a blocking area corresponding to the position of the background area, control the optical shutter part 122 to perform a filtering function based on the position of the blocking area, and output, through the projection part 112, the second projection image.

The sensor part 121 may include at least one from among an image sensor or an illumination sensor.

The image sensor may include an image lens. For example, the image sensor may include a camera. The image sensor may obtain sensing data which includes a captured image.

The illumination sensor may obtain sensing data which includes an illumination value that indicates a degree of brightness of the surrounding environment. In an example, the illumination sensor may sense one illumination value measured from a current position. In an example, the illumination sensor may sense a plurality of illumination values corresponding to each of a plurality of positions. The illumination sensor may sense an illumination value corresponding to each of a plurality of areas.

The at least one processor 111 may perform a correction function. The correction function may include an operation of performing software processing on a projection image. The correction function may include an image rendering operation. The correction function may include an operation of changing at least one from among a resolution, a brightness, a form, a color, and a character form of the projection image. The correction function may include an operation of cropping a portion of an area from among a whole area of the projection image. The correction function may be described as a first function, an image rendering function, or the like.

In an example, the correction function may include an operation of changing a color of a background portion of the projection image. Descriptions associated therewith will be described in FIG. 3.

The at least one processor 111 may perform a filtering function. The filtering function may include an operation of performing hardware processing on a projection image. The filtering function may include an operation of physically blocking at least a portion of the projection image being output. The filtering function may be described as a second function, a blocking function, a transmission obstructing function, or the like.

In an example, the filtering function may include an operation of disposing the optical shutter part 122 on a path through which the projection image is output and controlling whether light is transmitted. Descriptions associated therewith will be described in FIGS. 5, 6, and 7.

The at least one processor 111 may obtain a projection image. The projection image may indicate an image determined to be output at the projection surface.

The background area may be a second background area, and the at least one processor 111 may obtain a color value of a first background area and a color value of a projection surface area based on the first sensing data, and perform the correction function on the first projection image based on a difference value of the color value of the first background area and the color value of the projection surface area.

The at least one processor 111 may identify, based on the difference value being greater than or equal to a threshold value, the second background area from the first projection image, determine a color value of the second background area based on the color value of the first background area and the color value of the projection surface area, and obtain the second projection image by performing the correction function based on the color value of the second background area.

A detailed operation of performing the correction function will be described in FIGS. 11 and 12.

The at least one processor 111 may perform the correction function a plurality of times.

The at least one processor 111 may repeatedly obtain sensing data after having performed the correction function one time. The at least one processor 111 may determine whether the correction function has been normally performed by additionally obtaining sensing data. The at least one processor 111 may recheck whether the difference value of the color value of the first background area and the color value of the projection surface area is greater than or equal to the threshold value based on the sensing data obtained after having performed the correction function. The at least one processor 111 may repeatedly perform the correction function until the difference value of the color value of the first background area and the color value of the projection surface area become less than the threshold value. An operation of repeatedly performing the correction function will be described in FIG. 13.

The background area may be the second background area, and the at least one processor 111 may obtain, through the sensor part 121, second sensing data associated with the projection surface, obtain an illumination value of the first background area and an illumination value of the projection surface area based on the second sensing data, obtain a difference value of the illumination value of the first background area and the illumination value of the projection surface area, identify, based on the difference value being greater than or equal to the threshold value, the second background area from the first projection image, determine a brightness value of the second background area based on the illumination value of the first background area and the illumination value of the projection surface area, and obtain the second projection image by performing the correction function based on the brightness value of the second background area.

An operation of performing the correction function by using an illumination value will be described in FIG. 12.

According to various embodiments, sensing data for obtaining a color value and sensing data for obtaining an illumination value may be different. To differentiate the above, the sensing data for obtaining the color value may be described as the first sensing data, and the sensing data for obtaining the illumination value may be described as the second sensing data.

According to various embodiments, the color value and the illumination value may be obtained from the same sensing data. The at least one processor 111 may obtain both the color value and the illumination value based on the first sensing data.

If the first sensing data includes a captured image (or photograph), the at least one processor 111 may obtain the illumination value of the first background area and the illumination value of the projection surface area based on the captured image. The obtaining an illumination value of a specific area from a captured image may indicate an operation of obtaining a brightness value of the specific area. If the sensing data includes the captured image, the at least one processor 111 may obtain a color value or a brightness value (illumination value) of the specific area (a target area, a background area) based on the captured image.

The target area may include an area that includes key information. For example, the target area may include an area that includes a person or thing object.

The background area may include an area that does not include key information. For example, the background area may include an area in which the person or thing object is not included and is expressed with only one or more colors.

The at least one processor 111 may obtain a transmittance corresponding to the blocking area, and control the optical shutter part 122 to perform the filtering function based on the position of the blocking area and the transmittance.

According to an embodiment, the at least one processor 111 may perform the filtering function based on a preset transmittance. The preset transmittance may be changed according to a setting by a user.

According to an embodiment, the at least one processor 111 may perform the filtering function based on a transmittance corresponding to a content type.

The memory 113 may store transmittance table information which includes the transmittance per content type, and the at least one processor 111 may identify the content type of the first projection image, and obtain the transmittance corresponding to the content type based on the transmittance table information.

The transmittance table information may include a plurality of content types and information mapped with transmittance corresponding to each of the plurality of content types. For example, the transmittance table information may include information such as a first transmittance corresponding to a first type, a second transmittance corresponding to a second type, a third transmittance corresponding to a third type, a fourth transmittance corresponding to a fourth type, and a fifth transmittance corresponding to a fifth type.

The at least one processor 111 may identify a content type of the projection image being received. The at least one processor 111 may obtain the projection image and metadata corresponding to the projection image. The metadata may include information indicating a content type. The at least one processor 111 may receive the projection image and metadata corresponding to the projection image from an external apparatus. The external apparatus may include a content providing apparatus. The external apparatus may be described as an external server.

The at least one processor 111 may obtain a content type corresponding to the first projection image included in the metadata. The content type may be described as content type information. The at least one processor 111 may extract (or obtain) a transmittance corresponding to the identified content type from the transmittance table information.

The at least one processor 111 may extract (or obtain) the transmittance corresponding to the content type of the first projection image from among a plurality of transmittances.

The at least one processor 111 may control the optical shutter part 122 based on the transmittance corresponding to the content type.

In an example, the transmittance may be 100%. An operation of controlling the optical shutter part 122 with 100% transmittance may indicate an operation in which the filtering function is not performed.

In an example, the transmittance may be 0%. An operation of controlling the optical shutter part 122 with 0% transmittance may indicate an operation in which the filtering function is performed. If the optical shutter part 122 is controlled with 0% transmittance, a portion blocked through the optical shutter part 122 from among a whole portion of the projection image may not be output at the projection surface at all.

In an example, the transmittance may be one value greater than 100% and less than 100%. If the optical shutter part 122 is controlled with 50% transmittance, the portion blocked through the optical shutter part 122 from among the whole portion of the projection image may be output at the projection surface by only 50%.

According to various embodiments, the transmittance according to the content type may be determined between 0% and 100%. For example, the transmittance corresponding to the first type may be 0%, and the transmittance corresponding to the second type may be 50%.

In an example, a transmittance of a type indicating cinema and drama content may be 100%. In an example, a transmittance of a type indicating a message notification may be 50%. In an example, a transmittance of a type associated with a video call may be 0%.

Additional description on the content types will be described in FIGS. 9 and 10.

The at least one processor 111 may obtain, through the sensor part 121, third sensing data, change, based on a background object (or a third background area) being identified from the third sensing data, the position of the blocking area based on a position of the background object (or the third background area), and control the optical shutter part 122 to perform the filtering function based on a position of the changed blocking area.

Detailed descriptions associated therewith will be described in FIG. 16.

To distinguish between expressions indicating areas, ordinal numbers such as first, second, and third may be used. The ordinal number expressions indicating the above may be changed in accordance to an order of description. The third sensing data may also be described in another ordinal number expression according to the order of description.

The background area may be described as the background object. The target area may be described as a target object.

The at least one processor 111 may receive content which includes a plurality of projection images, and change, based on the position of the background area being changed for each of the plurality of projection images, the position of the blocking area based on a position of the changed background area.

The at least one processor 111 may receive the plurality of projection images (or a plurality of content frames). The target area and the background area may be changed for each of the plurality of projection images. The at least one processor 111 may track the background area in real-time for each of the plurality of projection images. If the position of the background area is changed, the position of the blocking area may also be changed. The at least one processor 111 may determine the position of the background area in real-time, and update the position of the blocking area in real-time.

The position of the target object (target area) being changed may mean that the position of the background object (background area) being changed. The at least one processor 111 may change the position of the blocking area taking into consideration the changed position of the background object.

The sensor part 121 may include the image sensor, and the at least one processor 111 may obtain, through the image sensor, the first sensing data which includes a captured image that captured the projection surface.

The captured image included in the first sensing data may include a plurality of pixels and pixel information corresponding to each of the plurality of pixels. The pixel information may include a pixel value. The pixel value may include at least one from among a color value or a brightness value indicating an RGB value.

According to various embodiments, the at least one processor 111 may obtain a brightness value based on a color value.

The at least one processor 111 may obtain (or calculate) at least one from among a color value of the specific area (target area, background area) or a brightness value (or illumination value) of the specific area (target area, background area) using pixel information.

The color value may indicate an average value. For example, a color value of a specific area may include an average color value of the plurality of positions (or pixels) included in the specific area. The color value may be described as color information.

The illumination value may indicate an average value. For example, an illumination value of a specific area may include an average illumination value of the plurality of positions (or pixels) included in the specific area. The illumination value may be described as illumination information.

The brightness value may indicate an average value. For example, a brightness value of a specific area may include an average brightness value of the plurality of positions (or pixels) included in the specific area. The brightness value may be described as brightness information.

The brightness value may be a concept which includes the illumination value. The illumination value may indicate a degree of brightness obtained through sensing data. The brightness value may be a concept which additionally includes the illumination value and the degree of brightness obtained from image data.

The electronic apparatus 100 may be implemented as a mobile device. The electronic apparatus 100 may be implemented as a mobile projector or a mobile image output device.

The electronic apparatus 100 may include a movement member. The movement member may mean a member for moving from a first position to a second position in a space in which the electronic apparatus 100 is disposed. The electronic apparatus 100 may control the movement member for the electronic apparatus 100 to be moved using force generated from a driving part 120. The electronic apparatus 100 may generate force to be transferred to the movement member using a motor included in the driving part 120.

The movement member may include at least one wheel (e.g., a circular wheel). The electronic apparatus 100 may move to a target position (or destination position) through the movement member. If a user input or a control command is received, the electronic apparatus 100 may rotate the movement member by transferring force generated through the motor to the movement member. The electronic apparatus 100 may control the movement member to adjust a rotation speed, a rotation direction, and the like. The electronic apparatus 100 may perform a movement operation (or a movement function) by controlling the movement member based on the target position, a direction of progress, or the like.

Figure 2:
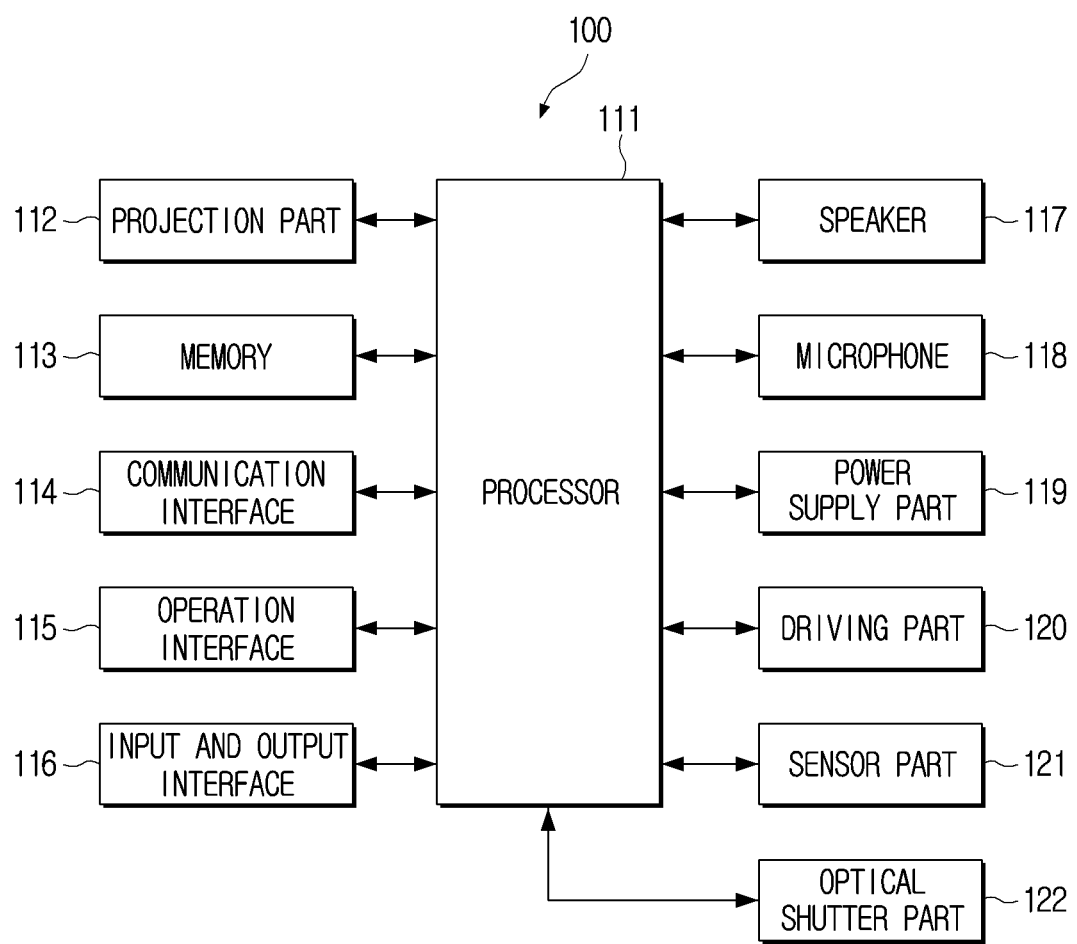
FIG. 2 is a block diagram illustrating a detailed configuration of an electronic apparatus in FIG. 3 according to an embodiment of the disclosure.
Figure 3:
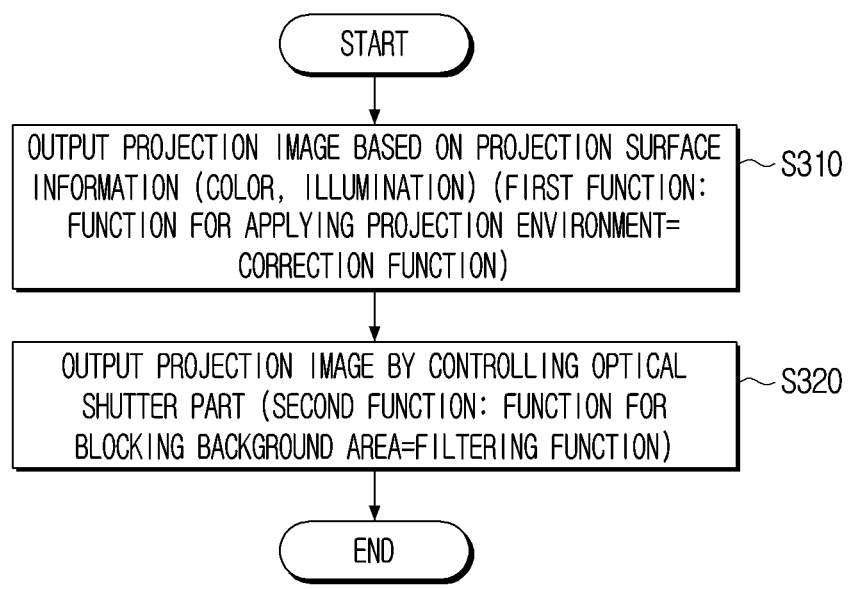
FIG. 3 is a diagram illustrating a correction function and a filtering function according to an embodiment of the disclosure.

FIG. 2 is a block diagram illustrating a detailed configuration of the electronic apparatus of FIG. 3 according to an embodiment of the disclosure.

Referring to FIG. 2, an electronic apparatus 100 may include at least one from among at least one processor 111, a projection part 112, memory 113, a communication interface 114, an operation interface 115, an input and output interface 116, a speaker 117, a microphone 118, a power supply part 119, a driving part 120, a sensor part 121, and an optical shutter part 122.

Configurations shown in FIG. 2 are merely various embodiments, and a portion of the configurations may be omitted, and a new configuration may be added.

Descriptions already described in FIG. 1 will be omitted.

The at least one processor 111 may be implemented as a digital signal processor (DSP) for processing a digital signal, a microprocessor, or a time controller (TCON). However, the embodiment is not limited thereto, and may include one or more from among a central processing unit (CPU), a micro controller unit (MCU), a micro processing unit (MPU), a controller, an application processor (AP), a graphics-processing unit (GPU), a communication processor (CP), or an advanced reduced instruction set computer (RISC) machines (ARM) processor, or may be defined by the relevant term. The at least one processor 111 may be implemented as a system on chip (SoC) or a large scale integration (LSI) in which a processing algorithm is embedded, and may be implemented in a form of a field programmable gate array (FPGA). The at least one processor 111 may perform various functions by executing computer executable instructions stored in the memory 113.

The projection part 112 may be a configuration that projects an image to the outside. According to various embodiments of the disclosure, the projection part 112 may be implemented with various projection methods (e.g., a cathode-ray tube (CRT) method, a liquid crystal display (LCD) method, a digital light processing (DLP) method, a laser method, etc.). In an example, the CRT method may be basically the same in principle with a CRT monitor. The CRT method may involve displaying an image on a screen by enlarging the image with a lens at a front of a cathode-ray tube. The above may be divided into a one tube type and a three tube type according to a number of CRTs, and in the case of the three tube type, a CRT of red, green, and blue may be individually separated and implemented.

The projection part 112 may include light sources of various types. For example, the projection part 112 may include at least one light source from among a lamp, a light emitting diode (LED), or a laser.

The projection part 112 may output an image in a 4:3 aspect ratio, a 5:4 aspect ratio, or a 16:9 wide aspect ratio according to use of the electronic apparatus 100, a user setting, or the like, and output an image in various resolutions such as, for example, and without limitation, a wide video graphics array (WVGA) (854*480), a super video graphics array (SVGA) (800*600), an extended graphics array (XGA) (1024*768), a wide extended graphics array (WXGA) (1280*720), a WXGA (1280*800), a super extended graphics array (SXGA) (1280*1024), an ultra extended graphics array (UXGA) (1600*1200), a Full high definition (HD) (1920*1080), or the like according to the aspect ratio.

The projection part 112 may perform various functions for adjusting an output image by a control of the at least one processor 111. For example, the projection part 112 may perform functions such as a zoom, a keystone, a quick corner (4-corner) keystone, and a lens shift.

The projection part 112 may enlarge or reduce an image according to a distance (a projection distance) with a screen. That is, a zoom function may be performed according to the distance with the screen. At this time, the zoom function may include a hardware method of adjusting a size of the screen by moving the lens and a software method of adjusting the size of the screen by cropping the image and the like. When the zoom function is performed, an adjustment of a focal point of the image may be necessary. For example, the method of adjusting the focal point may include a manual focusing method, a motorized method, and the like. The manual focusing method may refer to a method of matching the focal point manually, and the motorized method may refer to a method of matching the focal point automatically by the projector using a built-in motor when the zoom function is performed. When performing the zoom function, the projection part 112 may provide a digital zoom function through software, and provide an optical zoom function of performing the zoom function by moving the lens through the driving part 120.

The projection part 112 may perform a keystone correction function. If a height of a front projection is not balanced, the screen may be distorted toward a top or a bottom. The keystone correction function may refer to a function of correcting the distorted screen. For example, if a distortion occurs in a left or right direction of the screen, a horizontal keystone may be used to correct the above, and if the distortion occurs in an up or down direction, a vertical keystone may be used to correct the above. The quick corner (4-corner) keystone correction function may be a function for correcting the screen if a center area of the screen is normal but a corner area is not balanced. The lens shift function may be a function that moves an image (or screen) as is if the image (or screen) is outside the screen.

The projection part 112 may provide the zoom function, the keystone function, or the focus function by automatically analyzing the surrounding environment and a projection environment without user input. Specifically, the projection part 112 may automatically provide the zoom function, the keystone function, or the focus function based on a distance between the electronic apparatus 100 and the screen sensed through a sensor (depth camera, distance sensor, infrared sensor, illumination sensor, etc.), information about a space in which the electronic apparatus 100 is currently positioned, information about an amount of ambient light, and the like.

The memory 113 may be implemented as internal memory such as read only memory (ROM) included in the at least one processor 111 (e.g., electrically erasable programmable read-only memory (EEPROM)), random access memory (RAM), or the like, or implemented as memory separate from the at least one processor 111. In this case, the memory 113 may be implemented in a form of memory embedded in the electronic apparatus 100 according to a data storage use, or in a form of memory attachable to and detachable from the electronic apparatus 100. For example, data for the driving of the electronic apparatus 100 may be stored in the memory embedded in the electronic apparatus 100, and data for an expansion function of the electronic apparatus 100 may be stored in the memory attachable to and detachable from the electronic apparatus 100.

The communication interface 114 may be a configuration for performing communication with external apparatuses of various types according communication methods of various types. The communication interface 114 may include a wireless communication module or a wired communication module. Each communication module may be implemented in at least one hardware chip form.

The wireless communication module may be a module for communicating with the external apparatus via wireless means. For example, the wireless communication module may include at least one module from among a Wi-Fi module, a Bluetooth™ module, an infrared communication module, or other communication modules.

The Wi-Fi module and the Bluetooth™ module may perform communication in a Wi-Fi method and a Bluetooth™ method, respectively. When using the Wi-Fi module or the Bluetooth™ module, various connection information such as a service set identifier (SSID) and a session key may be first transmitted and received, and various information may be transmitted and received after communicatively connecting using the same.

The infrared communication module may perform communication according to an infrared data association (IrDA) technology of transmitting data wirelessly in short range by using infrared rays present between visible rays and millimeter waves.

The other communication modules may include at least one communication chip which performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

The wired communication module may be a module that communicates with the external apparatus via wired means. For example, the wired communication module may include at least one from among a local area network (LAN) module, an Ethernet module, a pair cable, a coaxial cable, an optical fiber cable, or an ultra wide-band (UWB) module.

The operation interface 115 may include input apparatuses of various types. For example, the operation interface 115 may include a physical button. At this time, the physical button may include a function key, a direction key (e.g., a four direction key), or a dial button.

The operation interface 115 may receive a user input using a non-contact method. If the user input is received through a contact method, a physical force is to be transferred to the electronic apparatus 100. Accordingly, a method for controlling the electronic apparatus 100 regardless of physical force may be necessary. Specifically, the operation interface 115 may receive a user gesture, and perform an operation corresponding to the received user gesture. The operation interface 115 may receive the user gesture through a sensor (e.g., an image sensor or an infrared sensor).

The operation interface 115 may receive a user input using a touch method.

The electronic apparatus 100 may receive a user input using voice recognition.

The input and output interface 116 may be a configuration for inputting and outputting at least one from among an audio signal and an image signal. The input and output interface 116 may receive input of at least one from among the audio and image signals from the external apparatus, and output a control command to the external apparatus.

The speaker 117 may be a configuration which outputs an audio signal. Specifically, the speaker 117 may include an audio output mixer, an audio signal processor, and a sound output module. The audio output mixer may synthesize a plurality of audio signals to be output into at least one audio signal.

The microphone 118 may be a configuration for receiving input of a user voice or other sounds and converting to audio data. The microphone 118 may receive the user voice in an activated state.

The power supply part 119 may receive supply of power from the outside and supply power to various configurations of the electronic apparatus 100. The power supply part 119 according to various embodiments of the disclosure may receive supply of power through various methods.

The driving part 120 may drive at least one hardware configuration included in the electronic apparatus 100. The driving part 120 may generate physical force and transfer to the at least one hardware configuration included in the electronic apparatus 100. The driving part 120 may generate driving power for movement of a hardware configuration (e.g., a movement of the electronic apparatus 100) or a rotation movement of a configuration (e.g., a rotation of a projection lens) included in the electronic apparatus 100.

The driving part 120 may adjust a projection direction (or a projection angle) of the projection part 112. The driving part 120 may move a position of the electronic apparatus 100. The driving part 120 may control the movement member to move the electronic apparatus 100. For example, the driving part 120 may control the movement member using the motor.

The sensor part 121 may include at least one sensor. Specifically, the sensor part 121 may include at least one from among a tilt sensor which senses a tilt of the electronic apparatus 100, and an image sensor which captures an image. The tilt sensor may mean an acceleration sensor or a gyro sensor, and the image sensor may mean a camera or a depth camera. The tilt sensor may be described as a movement sensor. The sensor part 121 may include various sensors in addition to the tilt sensor or the image sensor. For example, the sensor part 121 may include an illumination sensor and a distance sensor. The distance sensor may be a Time of Flight (ToF). The sensor part 121 may include a light detection and ranging (LiDAR) sensor.

The optical shutter part 122 may include a blocking member for blocking a transmittance of light. According to various embodiments, the optical shutter part 122 may be implemented as an OLED transparent display panel. According to various embodiments, the optical shutter part 122 may be implemented as an electrophoretic display. According to various embodiments, the optical shutter part 122 may be implemented with a multi-electrode type electronic paper film. The multi-electrode type electronic paper film may include a film which emits light using a plurality of electrodes. The optical shutter part 122 may be described as at least one from among a filter, a projection filter, an optical filter, or an optical projection filter.

The electronic apparatus 100 may further include a display (not shown).

The display (not shown) may be implemented as a display of various forms such as a liquid crystal display (LCD), an organic light emitting diode (OLED) display, and a plasma display panel (PDP). In the display (not shown), a driving circuit, which may be implemented in a form of an amorphous silicon thin film transistor (a-si TFT), a low temperature poly silicon (LTPS) TFT, an organic TFT (OTFT), or the like, a backlight unit, and the like may be included. The display (not shown) may be implemented as a touch screen coupled with a touch sensor, a flexible display, a three-dimensional display (3D display), or the like. According to various embodiment of the disclosure, the display (not shown) may include not only a display panel for outputting an image, but also a bezel for housing the display panel. Specifically, according to various embodiments of the disclosure, the bezel may include a touch sensor (not shown) for sensing a user interaction.

The electronic apparatus 100 may further include a shutter part (not shown). The shutter part (not shown) may include at least one from among a shutter, a fixing member, a rail, or a body. The shutter may block light being output from the projection part 112. The fixing member may fix a position of the shutter. The rail may be a path for moving the shutter and the fixing member. The body may be a configuration which includes the shutter and the fixing member.

FIG. 3 is a diagram illustrating a correction function and a filtering function according to an embodiment of the disclosure.

Referring to FIG. 3, an electronic apparatus 100 may perform at least one function when outputting the projection image.

The electronic apparatus 100 may perform the correction function, at operation S310. The correction function may include an operation of outputting a projection image based on projection surface information. The projection surface information may include at least one from among a color of the projection surface or an illumination of the projection surface. The color may be described as the color value, and the illumination may be described as the illumination value. The correction function may be described as the first function. The correction function may include a function of applying the projection environment.

The electronic apparatus 100 may perform the filtering function, at operation S320. The filtering function may include an operation of outputting the projection image by controlling the optical shutter part 122. The filtering function may be described as the second function. The filtering function may include a function of blocking the background area. The filtering function may include an operation of blocking an image corresponding to the background area.

Figure 4:
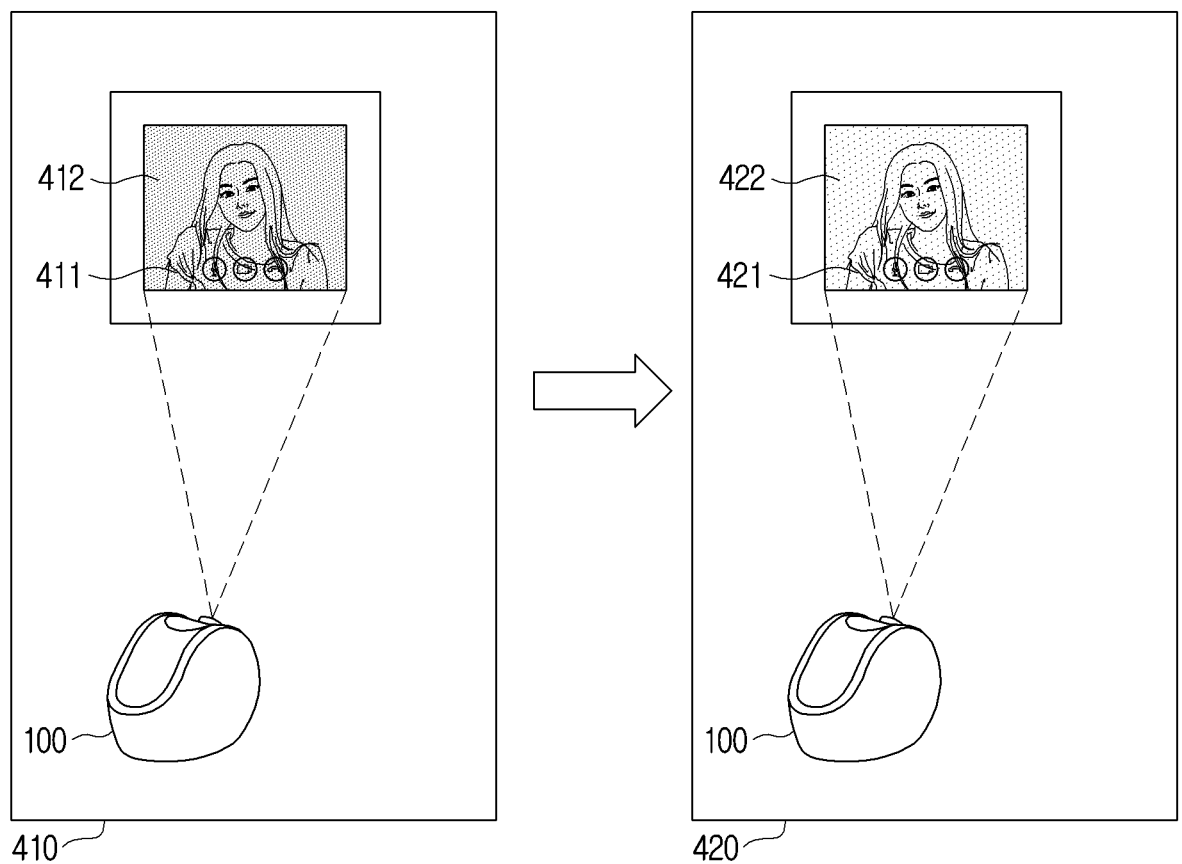
FIG. 4 is a diagram illustrating a correction function according to an embodiment of the disclosure.

FIG. 4 is a diagram illustrating a correction function according to an embodiment of the disclosure.

Referring to FIG. 4, according to diagram 410, an electronic apparatus 100 may output a projection image at a projection surface. A color of the projection surface and a color of the projection image may be different. If a target area 411 and a background area 412 included in the projection image are projected at the projection surface, the background area 412 may be emphasized.

According to diagram 420, the electronic apparatus 100 may perform the correction function on the projection image. The correction function may include an operation of changing a color (or brightness) of a background area 422 of the projection image without changing a color (or brightness) of a target area 421. The electronic apparatus 100 may change the color (or brightness) of the background area of the projection image to the color (or brightness) of the projection surface. A detailed operation associated therewith will be described in FIGS. 11 and 12.

FIG. 5 is a diagram illustrating a filtering function according to an embodiment of the disclosure.

Referring to FIG. 5, according to diagram 510, an electronic apparatus 100 may include a projection part 112 and an optical shutter part 122. The optical shutter part 122 may be disposed in a direction at which the projection part 112 outputs an image. The optical shutter part 122 may be disposed more outside of the electronic apparatus 100 than the projection part 112. The image (or light) output through the projection part 112 may pass the optical shutter part 122.

According to diagram 520, the electronic apparatus 100 may output a projection image 521 through the projection part 112, and apply blocking area information 522 through the optical shutter part 122. The applying blocking area information may include an operation of setting to obstruct the transmittance of light to the blocking area. The blocking area information may include a blocking image (or a filtering image).

The electronic apparatus 100 may output the blocking image through the optical shutter part 122. If the filtering function is performed using the optical shutter part 122, the background area included in the projection image may not be projected at the projection surface. If the transmittance is not 0%, the background area included in the projection image may be projected at the projection surface faintly.

Figure 6:
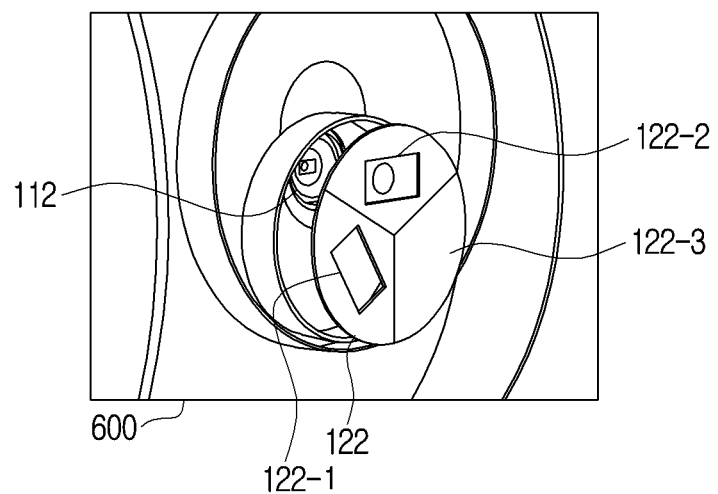
FIG. 6 is a diagram illustrating an optical shutter part according to an embodiment of the disclosure.

FIG. 6 is a diagram illustrating an optical shutter part according to an embodiment of the disclosure.

Referring to FIG. 6, according to diagram 600, an electronic apparatus 100 may include a projection part 112 and an optical shutter part 122. The optical shutter part 122 may include at least one from among a first shutter part 122-1, a second shutter part 122-2, and a third shutter part 122-3.

The optical shutter part 122 may be in a circular form. The optical shutter part 122 may include the first shutter part 122-1 disposed at a first area, the second shutter part 122-2 disposed at a second area, and the third shutter part 122-3 disposed at a third area. Each shutter part may be disposed separated every 120 degrees on a circular plate.

The first shutter part 122-1 may include a shutter member set such that all light is able to pass through. If the projection image passes the first shutter part 122-1, the projection image may be output as is at the projection surface. If an event that does not perform the filtering function is identified, the electronic apparatus 100 may horizontally align the first shutter part 122-1 with the projection part 112.

The second shutter part 122-2 may include a shutter member that passes light according to the preset transmittance. If the projection image passes the second shutter part 122-2, the projection image may be output at the projection surface by the preset transmittance. If the event performing the filtering function is identified, the electronic apparatus 100 may horizontally align the second shutter part 122-2 with the projection part 112.

The third shutter part 122-3 may include the shutter member that does not pass light. If the projection image passes the third shutter part 122-3, the projection image may not be output at the projection surface at all. If an event which is in standby for use is identified, the electronic apparatus 100 may horizontally align third shutter part 122-3 with the projection part 112.

The electronic apparatus 100 may determine whether to perform the filtering function, and dispose one from among the first shutter part 122-1, the second shutter part 122-2, and the third shutter part 122-3 with the projection part 112 in one line.

When using the first shutter part 122-1, the electronic apparatus 100 may control the optical shutter part 122 for the projection part 112 and the first shutter part 122-1 to be horizontally disposed.

The electronic apparatus 100 may determine the shutter part to be horizontally disposed at the projection part 112 by determining whether to perform the filtering function. The electronic apparatus 100 may rotate the optical shutter part 122 to horizontally dispose the disposed shutter part at the projection part 112. A motor may be used for the rotation operation. The motor rotating the optical shutter part 122 may be described as a second motor, and the motor for moving the electronic apparatus 100 itself may be described as a first motor.

According to various embodiments, the optical shutter part 122 may be implemented as the OLED transparent display panel.

According to various embodiments, the optical shutter part 122 may be implemented as the electrophoretic display.

According to various embodiments, the optical shutter part 122 may be implemented with the multi-electrode type electronic paper film. The multi-electrode type electronic paper film may include a film which emits light using the plurality of electrodes.

FIG. 7 is a diagram illustrating an optical shutter part according to an embodiment of the disclosure.

Referring to FIG. 7, according to diagram 710, an electronic apparatus 100 may include a transparent display panel 123. The transparent display panel 123 may include at least one from among a substrate or an optical shutter part 122. The optical shutter part 122 may be disposed at the substrate. The projection image output through the projection part 112 may be passed in an order of the substrate and the optical shutter part 122.

According to diagram 720, the electronic apparatus 100 may include the transparent display panel 123. The transparent display panel 123 may include at least one from among the substrate, the optical shutter part 122, or a pixel part. The optical shutter part 122 may be disposed at the substrate. The pixel part may output light corresponding to each of the pixels. The optical shutter part 122 may determine whether to transmit light, and light may be output from the pixel part itself. The projection image output through the projection part 112 may be transmitted in the order of the substrate, the optical shutter part 122, and the pixel part.

According to diagram 730, the electronic apparatus 100 may include the transparent display panel 123. The transparent display panel 123 may include at least one from among the substrate or the pixel part. The pixel part may be disposed at the substrate. The pixel part may output light corresponding to each of the pixels. The transparent display panel 123 may perform filtering of the background area of the projection image being output at the projection surface by outputting light without the optical shutter part 122. The projection image output through the projection part 112 may be passed in the order of the substrate and the pixel part.

The substrate indicated in FIG. 7 may include a transparent substrate.

Figure 8:
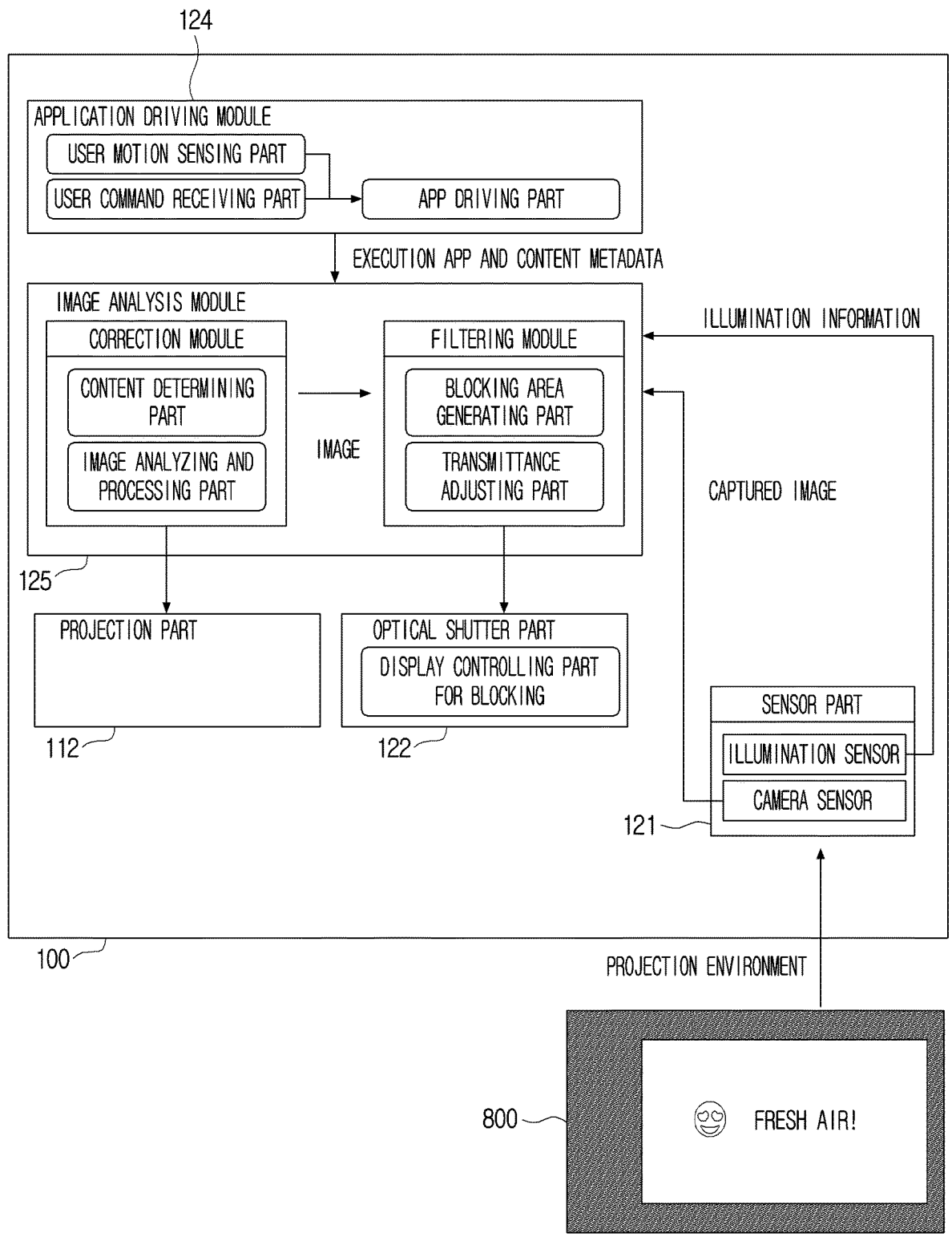
FIG. 8 is a diagram illustrating a plurality of modules included in an electronic apparatus according to an embodiment of the disclosure.

FIG. 8 is a diagram illustrating a plurality of modules included in an electronic apparatus according to an embodiment of the disclosure.

Referring to FIG. 8, an electronic apparatus 100 may include at least one from among a projection part 112, a sensor part 121, an optical shutter part 122, an application driving module 124, and an image analysis module 125.

The application driving module 124 may include at least one from among a user motion sensing part, a user command receiving part, or an application operating part.

The user motion sensing part may sense a motion of the user. The user motion sensing part may sense a user motion. The user motion sensing part may obtain sensing data from the sensor part 121. The user motion sensing part may analyze the user motion based on sensing data obtained from the sensor part 121. If a preset user motion (or gesture) is identified, the electronic apparatus 100 may transmit an application operating command to an application operating part.

The user command receiving part may receive a user input. The user command receiving part may receive a voice command, an operating command, and the like. The user command receiving part for receiving a voice command may include a microphone. When a preset user command is identified, the user command receiving part may transmit the application operating command to the application operating part.

When the operating command is received, the application operating part may specific the application to be executed, and transmit metadata associated with the specified application to the image analysis module 125.

The image analysis module 125 may receive the specified application and metadata associated with the specified application from the application driving module 124. The specified application may indicate an application necessary in outputting the projection image. The metadata may include content information which includes the projection image.

In diagram 800, it may be assumed that the projection image is output. The electronic apparatus 100 may obtain sensing data for the projection environment while the projection image is being output. The electronic apparatus 100 may obtain sensing data through the sensor part 121. The sensor part 121 may include at least one from among the illumination sensor or a camera sensor.

The sensor part 121 may obtain illumination information (or illumination data) of the projection environment through the illumination sensor. The illumination information may include an illumination value.

The sensor part 121 may obtain a captured image of the projection environment through the camera sensor. The captured image may include information associated with the projection surface.

The sensor part 121 may transmit illumination information obtained through the illumination sensor to the image analysis module 125. The sensor part 121 may transmit the captured image obtained through the camera sensor to the image analysis module 125.

The image analysis module 125 may include at least one from among a correction module 125-1 or a filtering module 125-2. The image analysis module 125 may perform an operation of analyzing the projection image or the captured image.

The image analysis module 125 may perform the correction function through the correction module 125-1. The correction module 125-1 may include at least one from among a content determining part and an image analyzing and processing part. The correction module 125-1 may identify a content type through the content determining part. The image analysis module 125 may determine whether to perform the correction function based on the content type identified through the content determining part. The correction module 125-1 may change a color of the projection image or an illumination (or brightness) of the projection image through the image analyzing and processing part. The correction module 125-1 may perform the correction function based on at least one from among the captured image or the illumination information.

The correction module 125-1 may transmit the changed projection image obtained by performing the correction function to the filtering module 125-2. The correction module 125-1 may transmit the changed projection image to the projection part 112.

The filtering module 125-2 may include at least one from among a blocking area generating part or a transmittance adjusting part. The filtering module 125-2 may generate (or identify) a blocking area for blocking a position corresponding to the background area included in the projection image through the blocking area generating part. The filtering module 125-2 may adjust the transmittance indicating how much light is to be transmitted at the position corresponding to the blocking area through the transmittance adjusting part. The filtering module may perform the filtering function based on at least one from among the captured image or the illumination information.

The filtering module 125-2 may transmit information associated with the blocking area (blocking area information) and the transmittance to the optical shutter part 122.

The electronic apparatus 100 may output the correction function performed projection image through the projection part 112. The electronic apparatus 100 may control the blocking area according to the preset transmittance through the optical shutter part 122. A part, corresponding to background area among whole area of the projection image, may be blocked through the optical shutter part 122.

Figure 9:
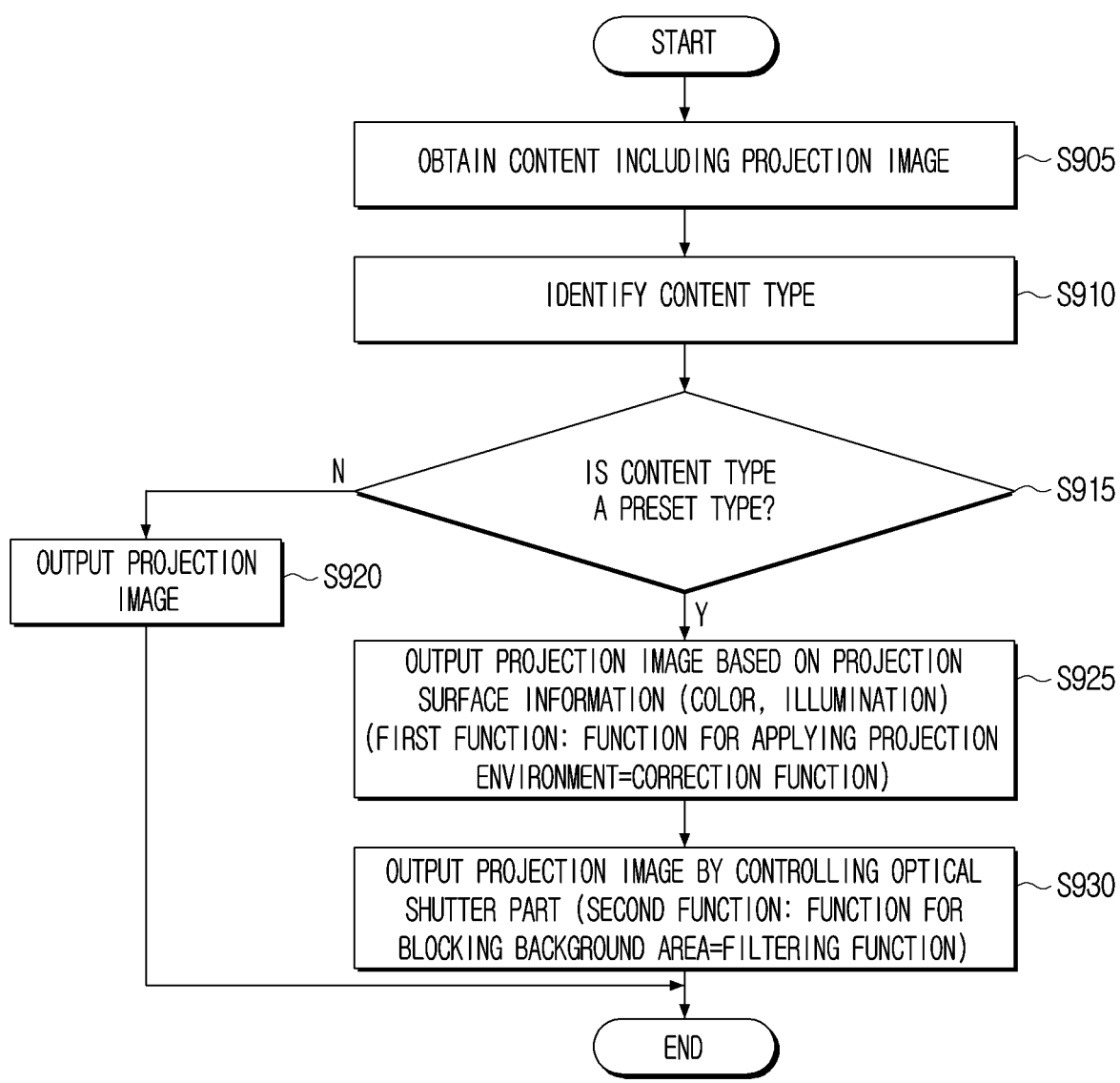
FIG. 9 is a diagram illustrating an operation which uses a content type according to an embodiment of the disclosure.

FIG. 9 is a diagram illustrating an operation which uses a content type according to an embodiment of the disclosure.

Referring to FIG. 9, an electronic apparatus 100 may obtain content which includes the projection image, at operation S905. The electronic apparatus 100 may identify the content type, at operation S910. The electronic apparatus 100 may identify whether the content type corresponds to a preset type, at operation S915.

If the content type is not the preset type, at operation S915-N, the electronic apparatus 100 may output the projection image as is, at operation S920.

If the content type is the preset type, at operation S915-Y, the electronic apparatus 100 may perform the correction function, at operation S925. The electronic apparatus 100 may output the projection image based on the projection surface information (color, illumination).

The electronic apparatus 100 may perform the filtering function, at operation S930. The electronic apparatus 100 may output the projection image by controlling the optical shutter part 122.

FIG. 10 is a diagram illustrating a content type according to an embodiment of the disclosure.

Referring to FIG. 10, a table 1000 may include a plurality of content types. A content of a first type may include a viewing content. The first type may include content provided from a content providing application. The first type may include content in which a presence or absence of a boundary of the background area is not important. If the content type is the first type, the electronic apparatus 100 may not perform the filtering function.

A content of a second type may include structured content. The second type may include at least one content from among a widget, an artificial intelligence (AI) interface, an avatar, a pop-up message, and an alarm. The second type may include content with a shape, a size, a position, and the like fixed. If the content type is the second type, the electronic apparatus 100 may perform the filtering function.

A content of a third type may include unstructured content. The third type may include content in which a target object moves in real-time. The third type may include, for example, content associated with a video call. The third type may include content in which a shape, a size, a position, and the like is changeable. If the content type is the third type, the electronic apparatus 100 may perform the filtering function. The electronic apparatus 100 may track the target object or background object necessary for performing the filtering function in real-time.

A content of a fourth type may include multiple content (multi-content). The fourth type may be a type that provides a plurality of content. The fourth type may include a type in which another content is provided while viewing one content. The fourth type may output a plurality of content. If the content type is the fourth type, the electronic apparatus 100 may perform the filtering function. The electronic apparatus 100 may determine whether to perform the filtering function for each of the plurality of content.

A content of a fifth type may include content in which the background area is separated. The target area and the background area included in the content may be separated in advance. The fifth type may include content in which the background area is removed by performing a video call. The fifth type may include content with the background area synthesized in performing the video call. If the content type is the fifth type, the electronic apparatus 100 may perform the filtering function for the background area by separating the target area and the background area.

Figure 11:
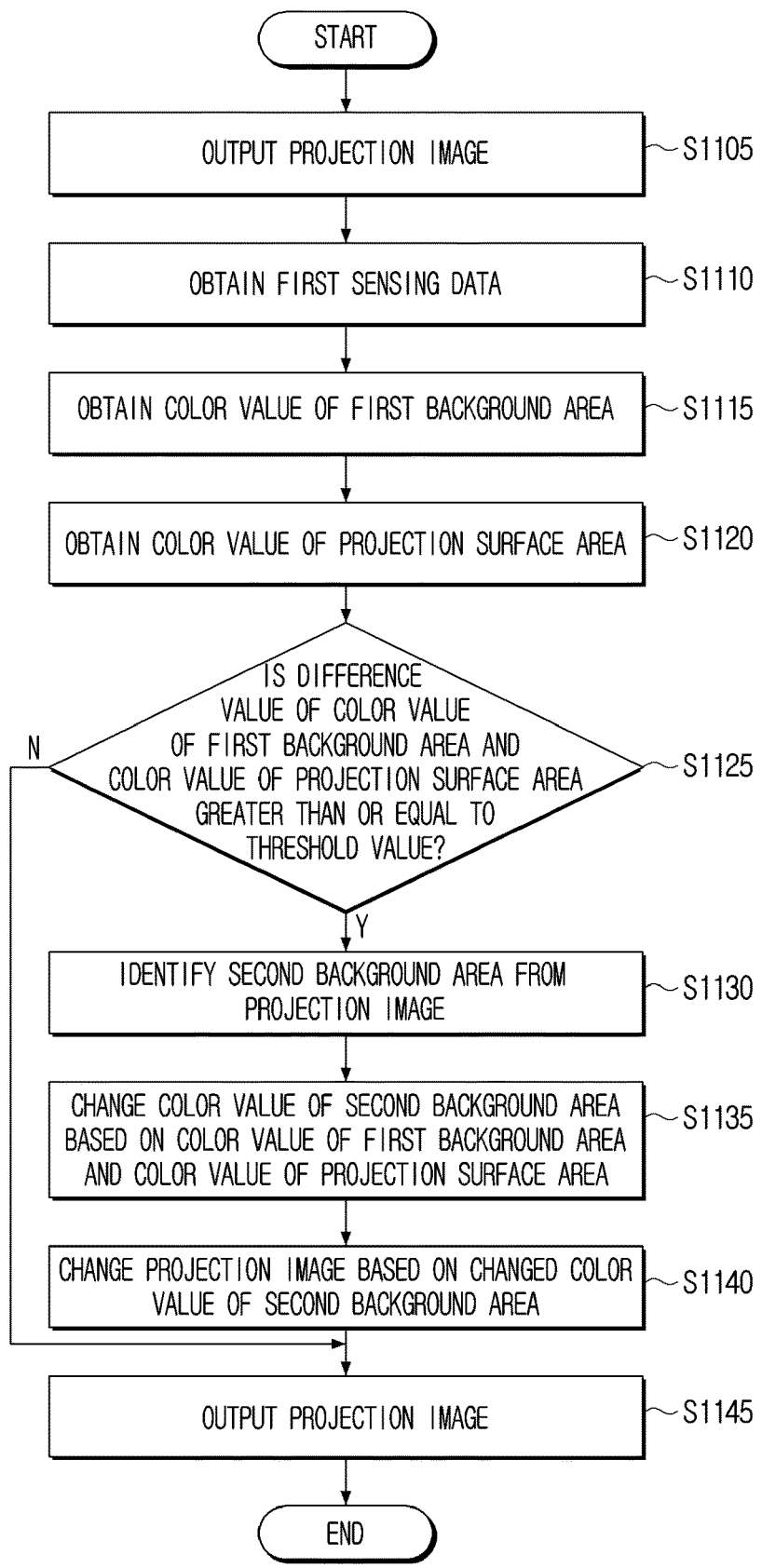
FIG. 11 is a diagram illustrating an operation performing a correction function by using a color value according to an embodiment of the disclosure.

FIG. 11 is a diagram illustrating an operation performing a correction function by using a color value according to an embodiment of the disclosure.

Referring to FIG. 11, an electronic apparatus 100 may output the projection image, at operation S1105. The electronic apparatus 100 may obtain first sensing data, at operation S1110. The electronic apparatus 100 may obtain the first sensing data through a sensor part 121. The sensor part 121 may include a sensor that can sense a color value (e.g., a camera sensor, an image sensor). The electronic apparatus 100 may obtain information associated with the projection surface based on the first sensing data.

The electronic apparatus 100 may obtain the output projection image and the first sensing data in which the projection surface is sensed. The electronic apparatus 100 may identify at least one from among a first target area, the first background area, and the projection surface area based on the first sensing data.

The electronic apparatus 100 may identify the projection surface at which the projection image is output. The electronic apparatus 100 may identify an area at which the projection image is not output (projection surface area) from among the projection surface. The electronic apparatus 100 may determine an area at which the projection image is output and an area within a preset distance (e.g., 20 centimeters (cm)) from among the area at which the projection image is not output as the projection surface area.

The electronic apparatus 100 may obtain the color value of the first background area, at operation S1115. The electronic apparatus 100 may obtain (or identify) a color value corresponding to the first background area based on the first sensing data. The color value corresponding to the first background area may include an average color value of a plurality of pixels corresponding to the first background area.

The electronic apparatus 100 may obtain the color value of the projection surface area, at operation S1120. The electronic apparatus 100 may obtain a color value corresponding to the projection surface area. The color value corresponding to the projection surface area may include an average color value of a plurality of pixels corresponding to the projection surface area.

The electronic apparatus 100 may compare the color value of the first background area and the color value of the projection surface area. The electronic apparatus 100 may obtain (or calculate) a difference value of the color value of the first background area and the color value of the projection surface area.

The electronic apparatus 100 may determine whether the difference value of the color value of the first background area and the color value of the projection surface area is greater than or equal to a threshold value, at operation S1125.

If the difference value is not greater than or equal to the threshold value, at operation S1125-N, the electronic apparatus 100 may output the projection image, at operation S1145.

If the difference value is greater than or equal to the threshold value, at operation S1125-Y, the electronic apparatus 100 may identify the second background area from the projection image, at operation S1130. The electronic apparatus 100 may identify at least one from among a second target area or the second background area from the projection image.

For convenience of description, the target area and the background area separated through the first sensing data may be described as the first target area and the first background area.

The target area and the background area separated through the projection image may be described as the second target area and the second background area.

The electronic apparatus 100 may change the color value of the second background area based on the color value of the first background area and the color value of the projection surface area, at operation S1135.

The electronic apparatus 100 may change the projection image based on the changed color value of the second background area, at operation S1140. The electronic apparatus 100 may output the changed projection image, at operation S1145. The projection image prior to change may be described as the first projection image, and the projection image after change may be described as the second projection image.

Figure 12:
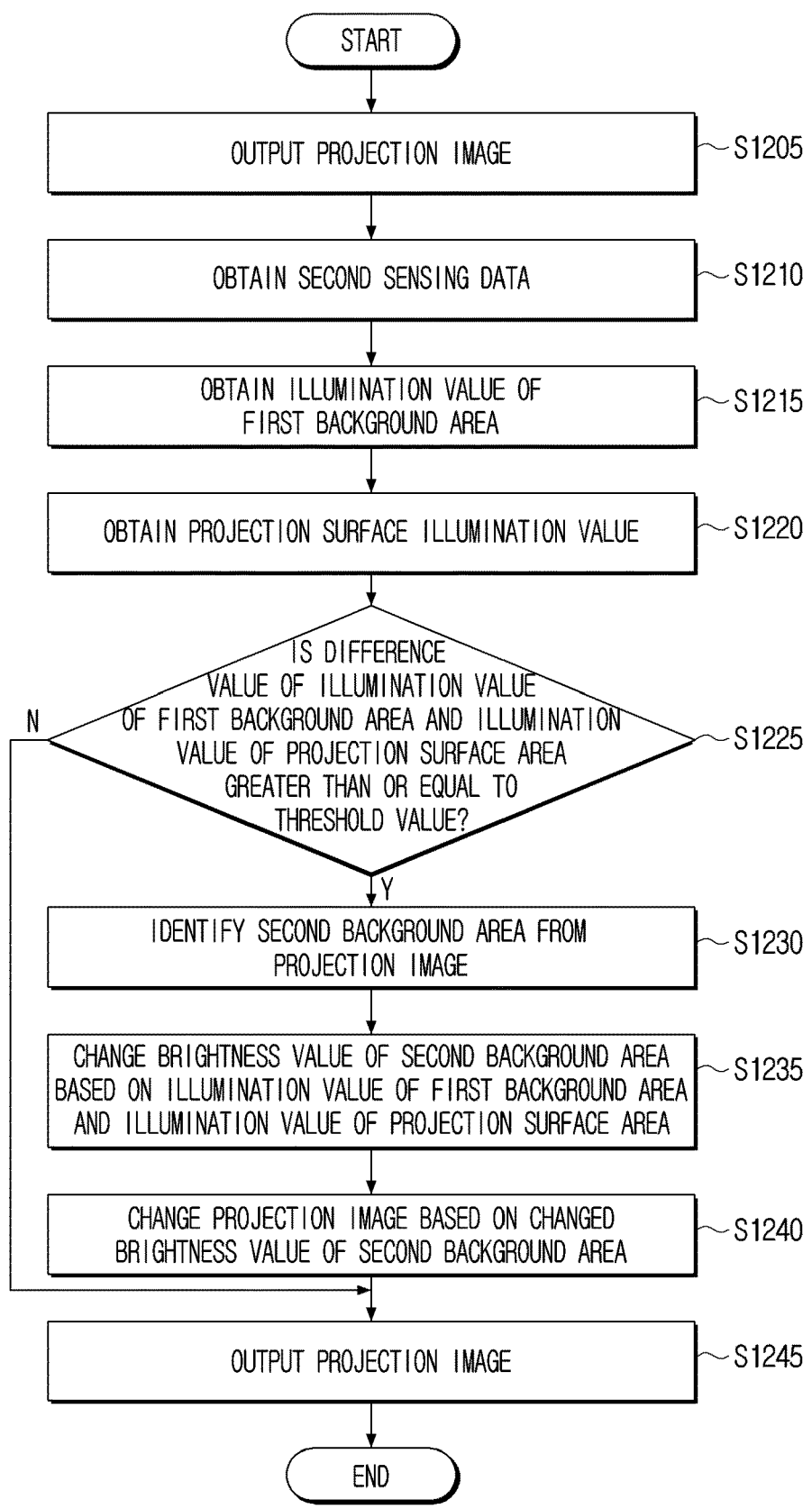
FIG. 12 is a diagram illustrating an operation performing a correction function by using an illumination value according to an embodiment of the disclosure.

FIG. 12 is a diagram illustrating an operation performing a correction function by using an illumination value according to an embodiment of the disclosure.

Referring to FIG. 12, an electronic apparatus 100 may output the projection image, at operation S1205. The electronic apparatus 100 may obtain second sensing data, at operation S1210. The electronic apparatus 100 may obtain the first sensing data through the sensor part 121. The sensor part 121 may include a sensor that can sense the illumination value (e.g., the camera sensor, the image sensor, the illumination sensor). The electronic apparatus 100 may obtain information associated with the projection surface based on the first sensing data.

The electronic apparatus 100 may obtain the illumination value of the first background area, at operation S1215. The electronic apparatus 100 may obtain (or identify) the illumination value corresponding to the first background area based on the first sensing data. The illumination value corresponding to the first background area may include an average illumination value of a plurality of pixels corresponding to the first background area.

The electronic apparatus 100 may obtain the illumination value of the projection surface area, at operation S1220. The electronic apparatus 100 may obtain the illumination value corresponding to the projection surface. The illumination value corresponding to the projection surface may include an average illumination value of a plurality of pixels corresponding to the projection surface area.

The electronic apparatus 100 may compare the illumination value of the first background area and the illumination value of the projection surface area. The electronic apparatus 100 may obtain (or calculate) a difference value of the illumination value of the first background area and the illumination value of the projection surface area.

The electronic apparatus 100 may determine whether the difference value of the illumination value of the first background area and the illumination value of the projection surface area is greater than or equal to the threshold value, at operation S1225.

If the difference value is not greater than or equal to the threshold value, at operation S1225-N, the electronic apparatus 100 may output the projection image, at operation S1245.

If the difference value is greater than or equal to the threshold value, at operation S1225-Y, the electronic apparatus 100 may identify the second background area from the projection image, at operation S1230. The electronic apparatus 100 may identify at least one from among the second target area or the second background area from the projection image.

For convenience of description, the target area and the background area separated through the first sensing data may be described as the first target area and the first background area.

The target area and the background area separated through the projection image may be described as the second target area and the second background area.

The electronic apparatus 100 may change the brightness value of the second background area based on the illumination value of the first background area and the illumination value of the projection surface area, at operation S1235.

The electronic apparatus 100 may change the projection image based on the changed brightness value of the second background area, at operation S1240. The electronic apparatus 100 may output the changed projection image, at operation S1245. The projection image prior to change may be described as the first projection image, and the projection image after change may be described as the second projection image.

In FIGS. 11 and 12, an operation of changing the projection image using the color value and the illumination value has been described, respectively. According to various embodiments, the electronic apparatus 100 may change the projection image simultaneously using the color value and the illumination value.

Figure 13:
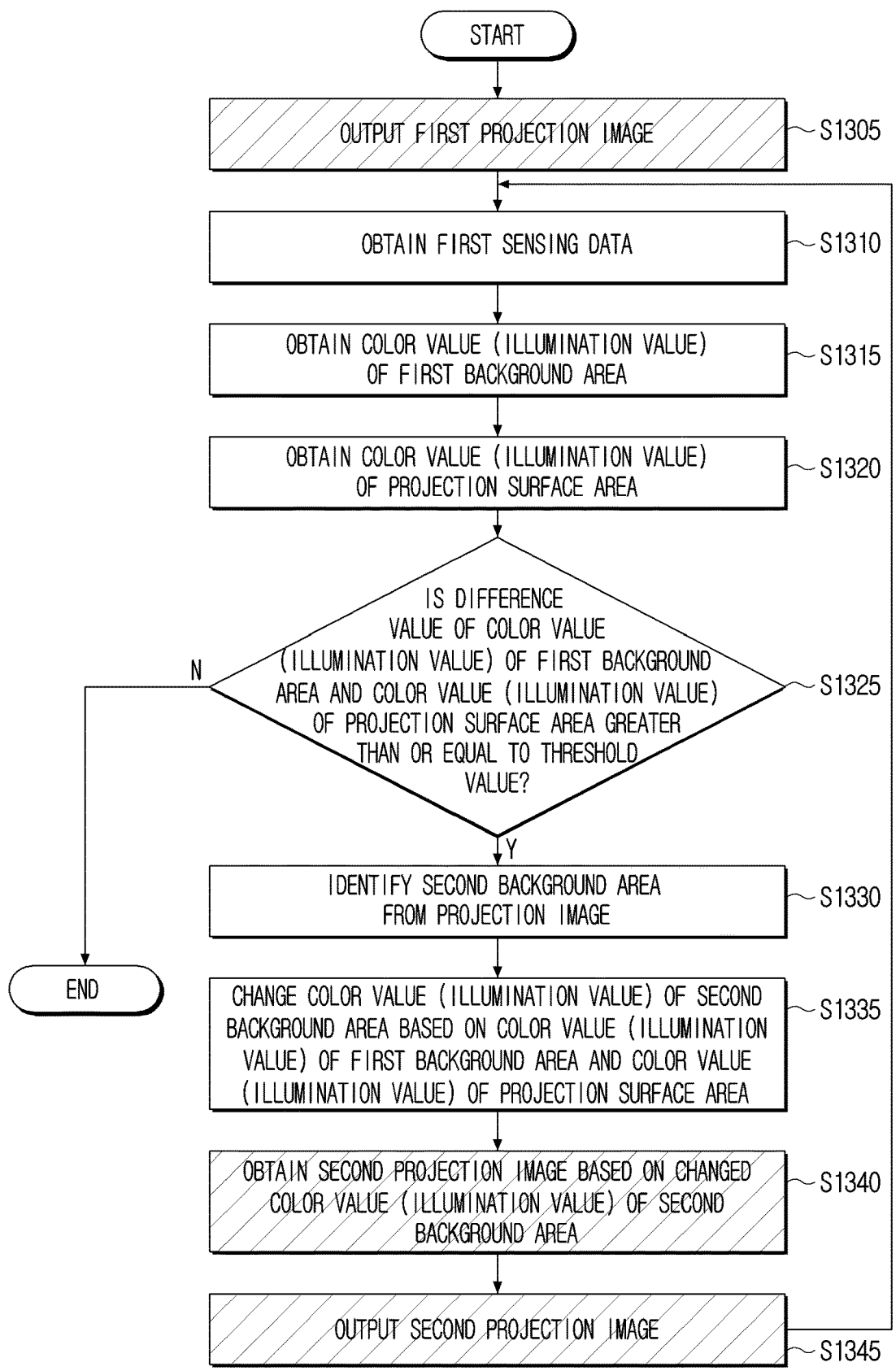
FIG. 13 is a diagram illustrating a correction function according to an embodiment of the disclosure.

FIG. 13 is a diagram illustrating a correction function according to an embodiment of the disclosure.

According to an embodiment, operations S1305, S1310, S1315, S1320, S1325, S1330, S1335, S1340, and S1345 in FIG. 13 may correspond to operations S1105, S1110, S1115, S1120, S1125, S1130, S1135, S1140, and S1145 in FIG. 11. Redundant descriptions thereof will be omitted.

According to an embodiment, operations S1305, S1310, S1315, S1320, S1325, S1330, S1335, S1340, and S1345 in FIG. 13 may correspond to operations S1205, S1210, S1215, S1220, S1225, S1230, S1235, S1240, S1245 in FIG. 12. Redundant descriptions thereof will be omitted.

Referring to FIG. 13, an electronic apparatus 100 may output the first projection image, at operation S1305. Then, the electronic apparatus 100 may perform operations S1310, S1315, S1320, and S1325.

The electronic apparatus 100 may determine whether a difference value of the color value (or the illumination value) of the first background area and the color value (or the illumination value) of the projection surface area is greater than or equal to the threshold value, at operation S1325.

If the difference value is not greater than or equal to the threshold value, at operation S1325-N, the electronic apparatus 100 may not perform the correction function.

If the difference value is greater than or equal to the threshold value, at operation S1325-Y, the electronic apparatus 100 may perform the correction function through operations S1330 and S1335.

The electronic apparatus 100 may obtain the second projection image based on the changed color value (or the illumination value) of the second background area, at operation S1340 The electronic apparatus 100 may output the second projection image, at operation S1345. After outputting the second projection image, the electronic apparatus 100 may repeat operations S1310, S1315, S1320, S1325, S1330, S1335, S1340, and S1345. The electronic apparatus 100 may repeat the correction function until a difference value of the background area and the color value (or the illumination value) of the projection surface area from among the whole area of the output projection image is less than the threshold value.

Figure 14:
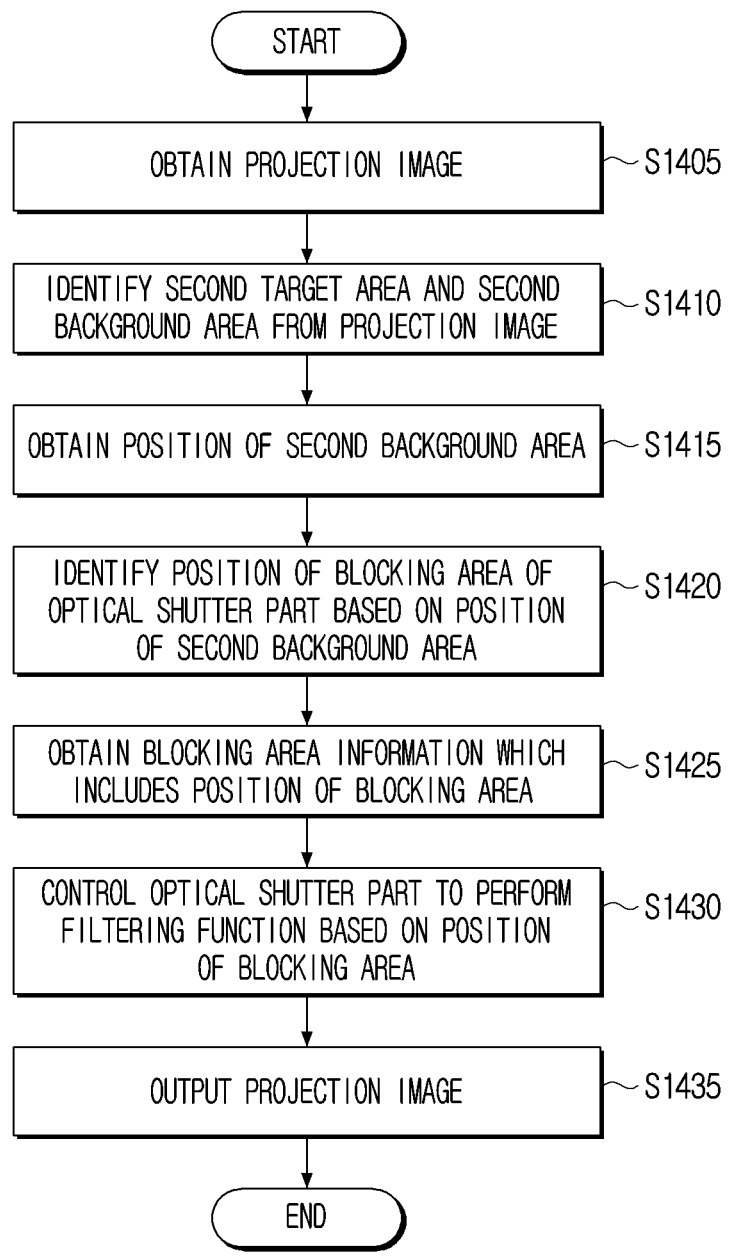
FIG. 14 is a diagram illustrating a filtering function according to an embodiment of the disclosure.

FIG. 14 is a diagram illustrating a filtering function according to an embodiment of the disclosure.

Referring to FIG. 14, an electronic apparatus 100 may obtain the projection image, at operation S1405. The electronic apparatus 100 may identify the second target area and the second background area from the projection image, at operation S1410. The electronic apparatus 100 may separate the second target area and the second background area from the projection image.

The electronic apparatus 100 may obtain a position (or a coordinate) of the second background area, at operation S1415. The electronic apparatus 100 may obtain the position of the separated (or identified) second background area.

The electronic apparatus 100 may identify a position of the blocking area of the optical shutter part 122 based on a position of the second background area, at operation S1420. The electronic apparatus 100 may obtain size information of the optical shutter part 122 corresponding to size information of the projection image. The electronic apparatus 100 may output the projection image by passing the optical shutter part 122. The electronic apparatus 100 may obtain the position of the blocking area corresponding to the position of the second background area. The electronic apparatus 100 may store mapping information mapped with a pixel position of the projection image and the position of the blocking area. The electronic apparatus 100 may obtain (or calculate) the position of the blocking area corresponding to the position of the second background area based on the mapping information.

The electronic apparatus 100 may obtain blocking area information which includes the position of the blocking area, at operation S1425. The electronic apparatus 100 may control the optical shutter part 122 to perform the filtering function based on the position of the blocking area, at operation S1430.

After controlling the optical shutter part 122, the electronic apparatus 100 may output the projection image, at operation S1435.

Figure 15:
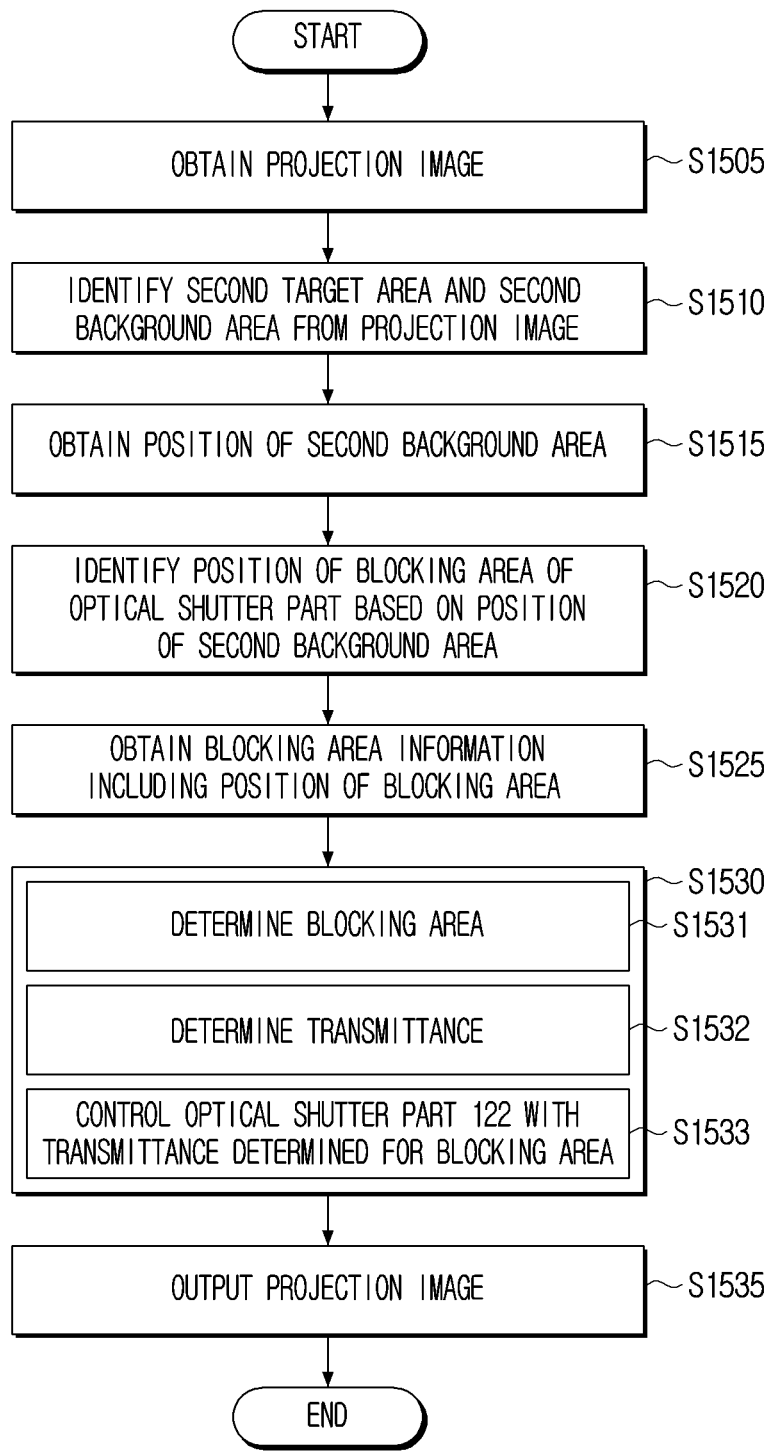
FIG. 15 is a diagram illustrating a filtering function according to an embodiment of the disclosure.

FIG. 15 is a diagram illustrating a filtering function according to an embodiment of the disclosure.

Operations S1505, S1510, S1515, S1520, S1525, S1530, and S1535 in FIG. 15 may correspond to operations S1405, S1410, S1415, S1420, S1425, S1430, and S1435 in FIG. 14. Redundant descriptions thereof will be omitted.

Referring to FIG. 15, an electronic apparatus 100 may perform the filtering function, at operation S1530. The filtering function may include determining the blocking area, at operation S1531, determining the transmittance, at operation S1532, and controlling an optical shutter part 122 with the determined transmittance for the blocking area, at operation S1533.

The electronic apparatus 100 may determine the blocking area based on the position of the blocking area. The electronic apparatus 100 may control the optical shutter part 122 according to the preset transmittance. The preset transmittance may be changed according to a user setting.

Figure 16:
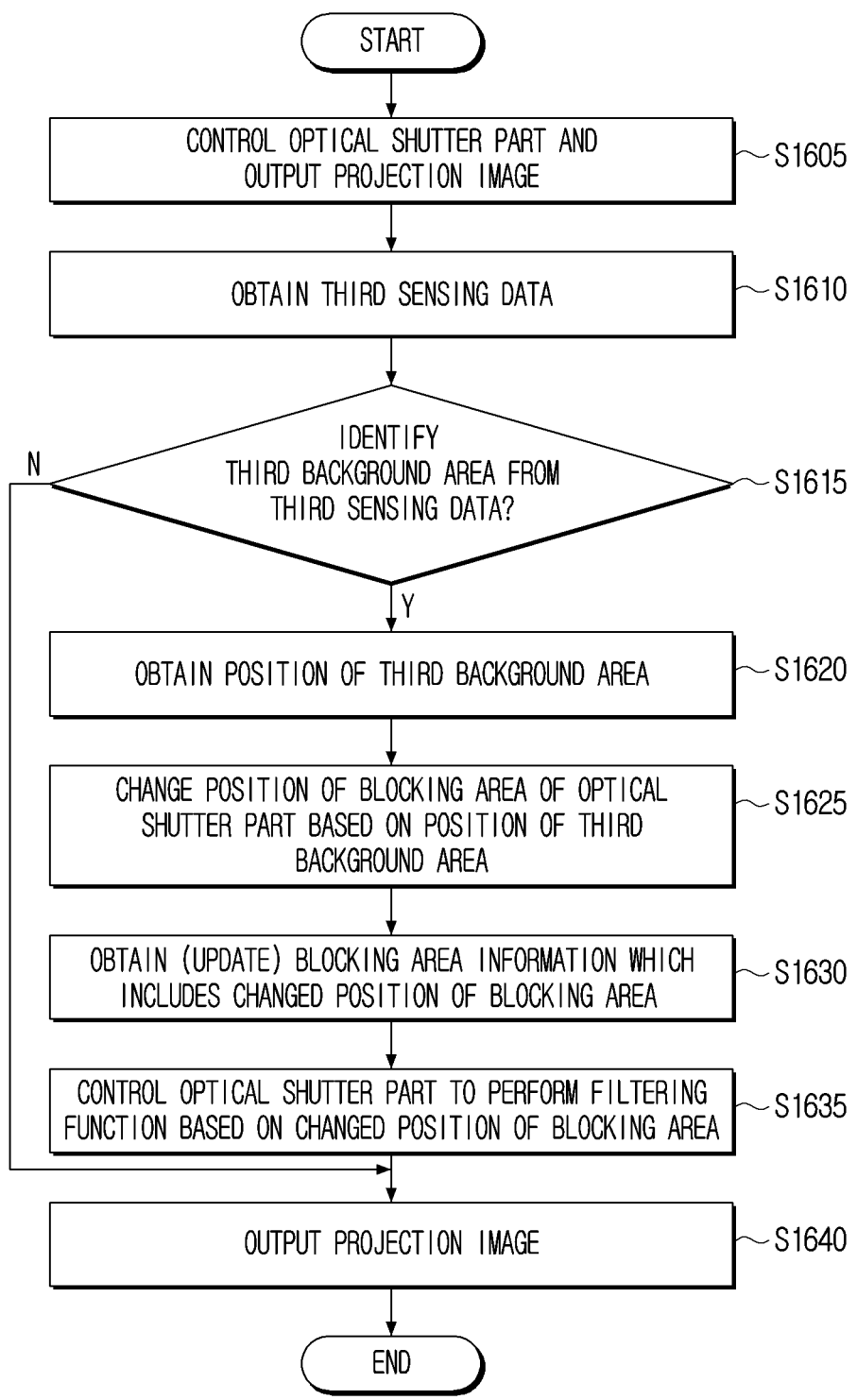
FIG. 16 is a diagram illustrating a filtering function according to an embodiment of the disclosure.

FIG. 16 is a diagram illustrating a filtering function according to an embodiment of the disclosure.

Referring to FIG. 16, an electronic apparatus 100 may control an optical shutter part 122 and output the projection image, at operation S1605. Operation S1605 may correspond to operations S1430 and S1435 in FIG. 14.

The electronic apparatus 100 may obtain third sensing data, at operation S1610.

The electronic apparatus 100 may determine whether the third background area (or background object) is identified from the third sensing data, at operation S1610. The third background area (or background object) may indicate an area which is not the target area from among the area at which the projection image is output. If the optical shutter part 122 is normally operated, the third background area (or background object) may not be identified. If the transmittance of the optical shutter part 122 is incorrect, or if the position of the blocking area is set incorrectly, the third background area (or background object) of the projection image may be output at the projection surface.

If the third background area (or background object) is not identified from the third sensing data, at operation S1615-N, the electronic apparatus 100 may output the projection image, at operation S1640.

If the third background area (or background object) is identified from the third sensing data, at operation S1615-Y, the electronic apparatus 100 may obtain a position of the third background area (or background object), at operation S1620.

The electronic apparatus 100 may change the position of the blocking area of the optical shutter part 122 based on the position of the position of the third background area (or background object), at operation S1625.

The electronic apparatus 100 may obtain (or update) blocking area information which includes the changed position of the blocking area, at operation S1630.

The electronic apparatus 100 may control the optical shutter part 122 to perform the filtering function based on the changed position of the blocking area, at operation S1635.

The electronic apparatus 100 may output the projection image, at operation S1640.

Figure 17:
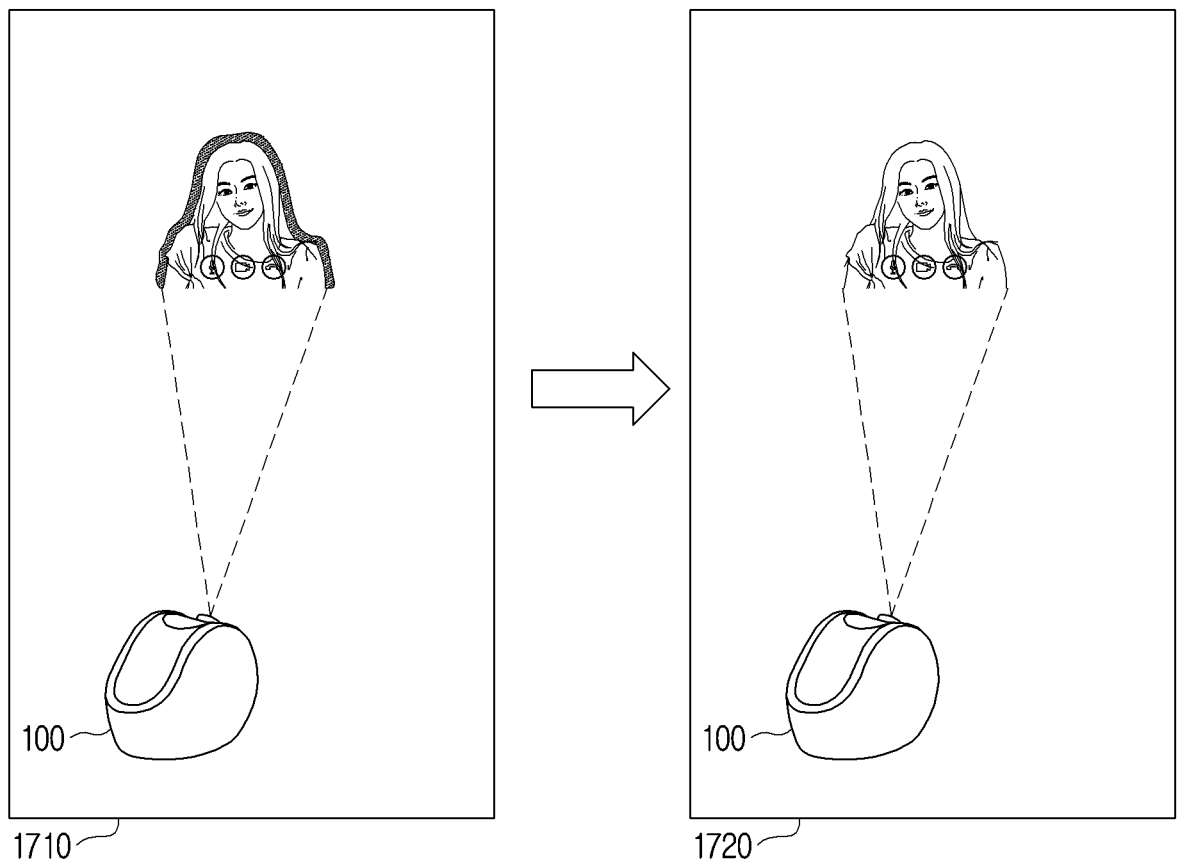
FIG. 17 is a diagram illustrating a filtering function according to an embodiment of the disclosure.

FIG. 17 is a diagram illustrating a filtering function according to an embodiment of the disclosure.

Referring to FIG. 17, in diagram 1710, it may be assumed that the second background area and the blocking area of the projection image are not a match. When it is not a match, the second background area may not be fully blocked. The electronic apparatus 100 may change the position of the blocking area through the operation described in FIG. 16.

Diagram 1720 may indicate the projection image to be output after changing the position of the blocking area. The second background area may be fully blocked through the optical shutter part 122.

FIG. 18 is a diagram illustrating an inversion function according to an embodiment of the disclosure.

Referring to FIG. 18, diagram 1810 may indicate the first projection image being output in a dark environment. It may be assumed that the background area of the first projection image is white. If the background area in the dark environment is white, the background portion may be emphasized. Key information in the first projection image may be merely a part thereof but the background portion may be unnecessarily emphasized.

Diagram 1820 may indicate the second projection image performed with the inversion function and the correction function being output. The electronic apparatus 100 may invert a color of a text through the inversion function. For example, the electronic apparatus 100 may change a black letter to a white letter. The electronic apparatus 100 may change the background portion of the first projection image from a white color to a grey color through the correction function. There may be a likelihood of the background portion of the second projection image output at the projection surface being recognized despite the correction function.

Diagram 1830 indicates the second projection image being output while performing the filtering function. The electronic apparatus 100 may control the optical shutter part 122 through the filtering function. The background portion of the second projection image may not be output at the projection surface.

FIG. 19 is a diagram illustrating a filtering function according to an embodiment of the disclosure.

Referring to FIG. 19, diagram 1910 may indicate the projection image being output without the filtering function being performed. The background portion may be easily recognized from the projection image output at the projection surface.

Diagram 1920 may indicate the projection image being output with the filtering function performed. The background portion may not be recognized from the projection image output at the projection surface. When the filtering function is performed, the space may be efficiently used. The user may focus on the content. The projection image may be minimally overlapped by an object or the user.

According to various embodiments, the electronic apparatus 100 may change a resolution of a target portion. When the resolution of the target portion is changed, the electronic apparatus 100 may change the position or even the size of the blocking area.

FIG. 20 is a diagram illustrating a filtering function according to an embodiment of the disclosure.

Referring to FIG. 20, diagram 2010 may indicate the projection image being output without the filtering function performed. The background portion may be easily recognized from the projection image output at the projection surface. The background portion may be easily recognized from the projection image output at the projection surface. The user may experience inconvenience due to background portion of the projection image overlapping in part with another home appliance.

Diagram 2020 may indicate the projection image being output with the filtering function performed. The background portion may not be recognized from the projection image output at the projection surface. When the filtering function is performed, the background portion of the projection image may not be overlapped with another home appliance.

FIG. 21 is a diagram illustrating a filtering function according to an embodiment of the disclosure.

Referring to FIG. 21, diagram 2110 may indicate the projection image being output without the filtering function performed. The background portion may be easily recognized from the projection image output at the projection surface. The background portion may be easily recognized from the projection image output at the projection surface. The user may experience inconvenience due to background portion of the projection image overlapping in part with another home appliance.

Diagram 2120 may indicate the projection image being output with the filtering function performed. The background portion may not be recognized from the projection image output at the projection surface. When the filtering function is performed, the background portion of the projection image may not be overlapped with another home appliance.

When the background portion of the projection image is not overlapped with another home appliance, the user may simultaneously view the projection image and content output from another home appliance without being affected by color, resolution, and the like.

FIG. 22 is a diagram illustrating an operation of changing a blocking area in real-time according to an embodiment of the disclosure.

Referring to FIG. 22, diagram 2210 may indicate the projection image being output with the filtering function performed. The background portion may not be recognized from the projection image output at the projection surface.

Diagram 2220 may indicate the target portion being changed due to the projection image output from diagram 2210 being changed. The electronic apparatus 100 may track the target portion (or target area) in real-time. When the target portion (or target area) is changed, the electronic apparatus 100 may track the background portion (or background area) in real-time. The electronic apparatus 100 may continuously perform the filtering function based on the background portion identified by tracking.

When the target portion or the background portion is identified as being changed according to a tracking result, the electronic apparatus 100 may change the position of the blocking area in real-time.

FIG. 23 is a diagram illustrating an inversion function according to an embodiment of the disclosure.

Referring to FIG. 23, diagram 2310 may indicate the projection image being output.

Diagram 2320 may indicate a minimum area necessary being identified from among the projection image. The electronic apparatus 100 may indicate that the minimum area necessary is an area included with key information of a content. The electronic apparatus 100 may identify the minimum area necessary which includes key information of a content.

Diagram 2330 may indicate a cropping of the identified minimum area necessary. The electronic apparatus 100 may crop (or identify) the identified minimum area necessary. The electronic apparatus 100 may obtain (or extract) key information of a content based on the cropped minimum area necessary. The key information may include at least one from among a text, an image, an icon, a number, and a user interface (UI).

Diagram 2340 may indicate the projection image performed with the inversion function being output. The electronic apparatus 100 may perform the inversion function on the obtained key information. The inversion function may include an operation of inverting a color. For example, the inversion function may include an operation of changing black information to white information, and changing the white information to the black information. The inversion function may include an operation of changing the color, the brightness, and the like of the background portion.

Figure 24:
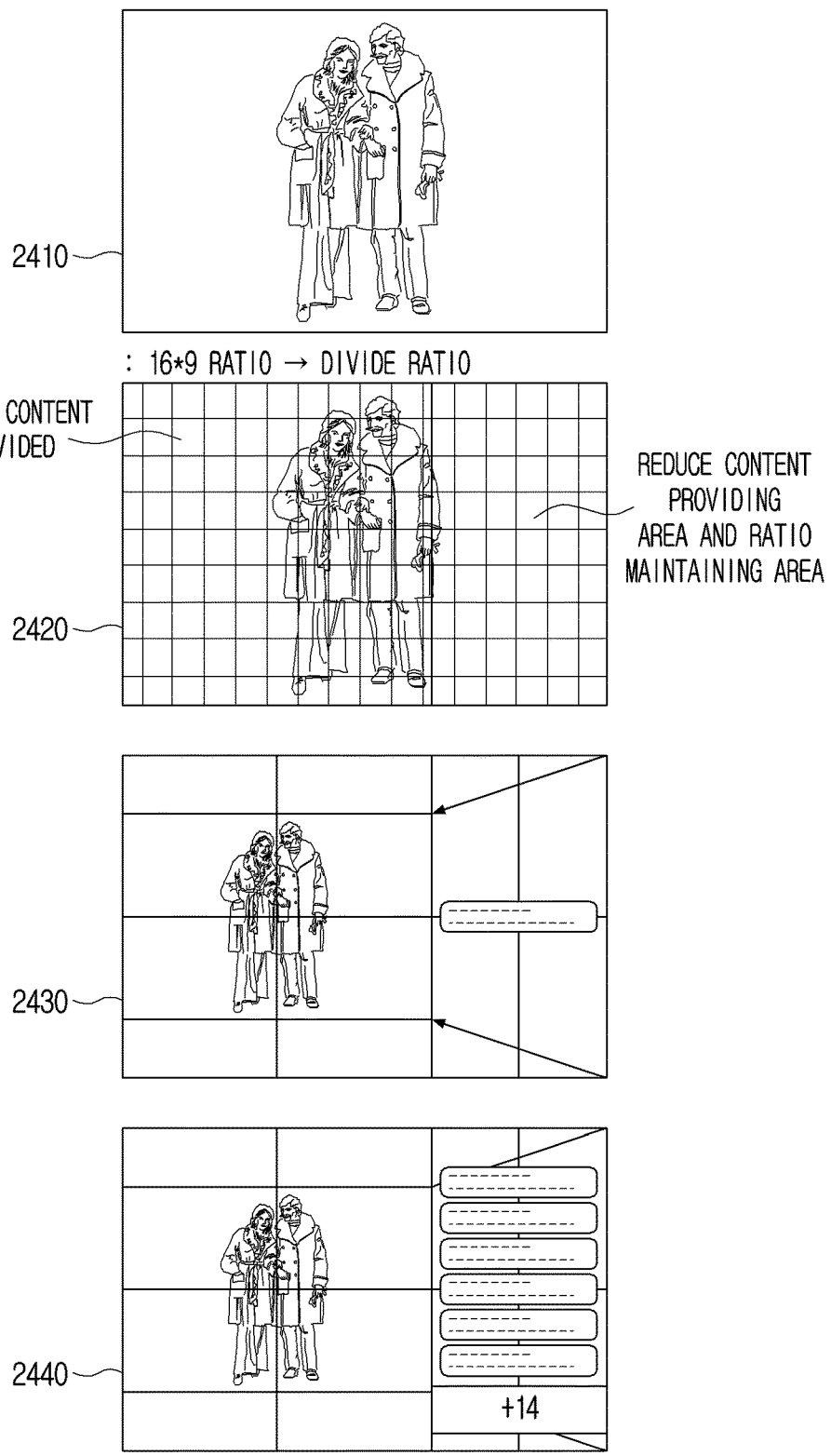
FIG. 24 is a diagram illustrating an operation of providing multiple content according to an embodiment of the disclosure.

FIG. 24 is a diagram illustrating an operation of providing multiple content according to an embodiment of the disclosure.

Referring to FIG. 24, diagram 2410 may indicate a projection image included in a first content being output.

Diagram 2420 may indicate a projection area being divided to provide a second content. The electronic apparatus 100 may receive an output request for the second content while outputting the first content. The electronic apparatus 100 may obtain a minimum area necessary for the first content and a minimum area necessary for the second content. The electronic apparatus 100 may divide the projection area based on the minimum area necessary for the first content and the minimum area necessary for the second content. The electronic apparatus 100 may reduce the area at which the first content is output from among the whole projection area. The divided area may be separated into a first content area and a second content area.

Diagram 2430 may indicate a resolution of the projection image included in the first content being changed. The electronic apparatus 100 may determine the resolution of the projection image of the first content based on a size of the first content area. The resolution may be reduced. The electronic apparatus 100 may determine a resolution of the projection image of the second content based on a size of the second content area. It may be assumed that the second content is a content that provides message notifications. If one message notification is provided, the electronic apparatus 100 may provide a notification at a center position from among the second content area.

Diagram 2440 may indicate that the second content is a content that provides a plurality of notifications. If the plurality of notifications is provided and it is identified that all the plurality of notifications cannot be provided to the second content area, the electronic apparatus 100 may output only a portion of the notifications from among the plurality of notifications to the second content area, and output a UI indicating that there are additional notifications present. The UI indicating the presence of additional notifications may include a preset GUI or a UI indicating a number of message notifications.

FIG. 25 is a diagram illustrating a filtering function according to an embodiment of the disclosure.

Referring to FIG. 25, diagram 2510 may indicate the projection image being output without the filtering function performed. The background portion may be easily recognized from the projection image output at the projection surface. The user may experience inconvenience due to background portion of the projection image overlapping in part with another object (e.g., a curtain).

Diagram 2520 may indicate the projection image being output with the filtering function performed. The background portion may not be recognized from the projection image output at the projection surface. When the filtering function is performed, the background portion of the projection image may not be overlapped with another object (e.g., curtain). If the background portion of the projection image is not be overlapped with another object, a sense of immersion (or a sense of engagement) by the user may be increased FIG. 26 is a diagram illustrating a blocking image according to an embodiment of the disclosure.

Referring to FIG. 26, diagram 2610 indicates a projection image 2611 being filtered using a blocking image 2612. The electronic apparatus 100 may generate the blocking image 2612. The electronic apparatus 100 may control the optical shutter part 122 by using the blocking image 2612. It may be assumed that the blocking image 2612 is an image set at 100% transmittance to transmit all light. The projection image 2611 may be projected as is at the projection surface without blocking.

Diagram 2620 may indicate the projection image 2611 being filtered by using a blocking image 2622. The electronic apparatus 100 may generate the blocking image 2622. The electronic apparatus 100 may control the optical shutter part 122 by using the blocking image 2622. The blocking image 2622 may be an image to set so that light is not passed through with respect to the blocking area. A portion (background portion) corresponding to the blocking area from among the projection image 2611 may not be output at the projection surface. Only the target portion from among the projection image 2611 may be output at the projection surface.

Diagram 2630 may indicate the projection image 2611 being filtered by using a blocking image 2632. The electronic apparatus 100 may generate the blocking image 2632. The electronic apparatus 100 may control the optical shutter part 122 by using the blocking image 2632. The blocking image 2632 may have different a transmittance according to the position of the blocking area. The transmittance may be gradually increased or decreased.

Figure 27:
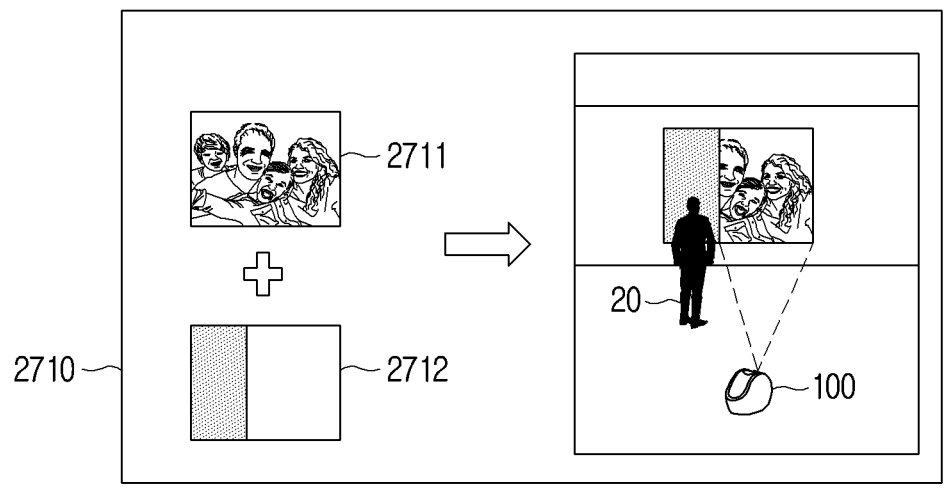
FIG. 27 is a diagram illustrating a blocking image according to an embodiment of the disclosure.

FIG. 27 is a diagram illustrating a blocking image according to an embodiment of the disclosure.

Referring to FIG. 27, diagram 2710 may indicate a user 20 being identified near the projection surface. The electronic apparatus 100 may obtain sensing data. The electronic apparatus 100 may identify that the user 20 is present near the projection surface through sensing data. The electronic apparatus 100 may identify a position of the user 20 based on the sensing data.

The electronic apparatus 100 may determine the position of the blocking area based on the position of the user 20, and perform the filtering function based on the position of the blocking area. The electronic apparatus 100 may generate (or obtain) a blocking image 2712 based on the position of the user 20. The electronic apparatus 100 may control the optical shutter part 122 by using the blocking image 2712. After the optical shutter part 122 is controlled, the electronic apparatus 100 may output a projection image 2711.

A portion corresponding to the position at which the user 20 is present from among the whole portion of the projection image 2711 may not be output at the projection surface.

If a movement of the user 20 is tracked in real-time, the electronic apparatus 100 may continuously change the blocking area according to the position of the user 20. If the user 20 is not identified in a field of view of the electronic apparatus 100, the electronic apparatus 100 may perform the filtering function without taking into consideration the blocking area corresponding to the user 20.

FIG. 28 is a diagram illustrating a fade-in effect and a fade-out effect according to an embodiment of the disclosure.

Referring to FIG. 28, diagram 2810 may indicate a starting of content output. The electronic apparatus 100 may output a projection image included with content according to a content start event. The electronic apparatus 100 may provide a fade-in effect using the optical shutter part 122. The electronic apparatus 100 may provide the fade-in effect by gradually changing the position of the blocking area of the optical shutter part 122. A size of the blocking area may be reduced as time passes. A non-blocking area may be expanded based on a center as time passes.

Diagram 2820 may indicate the content output being ended. The electronic apparatus 100 may provide a fade-out effect by controlling the optical shutter part 122 according to a content end event. The electronic apparatus 100 may provide the fade-out effect by gradually changing the position of the blocking area of the optical shutter part 122. The blocking area may expand as time passes. The non-blocking area may be reduced based on the center as time passes.

FIG. 29 is a diagram illustrating a system which includes an electronic apparatus and a shutter apparatus according to an embodiment of the disclosure.

Referring to FIG. 29, an electronic apparatus 100 may perform the filtering function by using a shutter apparatus 200 rather than the optical shutter part 122. In the previous description, it was assumed that the electronic apparatus 100 included the optical shutter part 122. According to various embodiments, the optical shutter part 122 may not be included in the electronic apparatus 100 and a separate shutter apparatus 200 may be present.

The electronic apparatus 100 may obtain a user command for outputting the projection image, at operation S2905.

The electronic apparatus 100 may perform the correction function, at operation S2910. The electronic apparatus 100 may perform the filtering function, at operation S2920. Operations S2910 and S2920 may correspond to operations S310 and S320 in FIG. 3. Redundant descriptions thereof will be omitted.

The electronic apparatus 100 may transmit the blocking area information to the shutter apparatus 200, at operation S2925. The shutter apparatus 200 may perform the filtering function based on the blocking area information received from the electronic apparatus 100.

The shutter apparatus 200 may perform the filtering function with the determined transmittance for the blocking area, at operation S2930.

FIG. 30 is a diagram illustrating a controlling method of an electronic apparatus according to an embodiment of the disclosure.

Referring to FIG. 30, a controlling method of an electronic apparatus 100 including a projection part 112 and an optical shutter part 122 may include outputting the first projection image at the projection surface, at operation S3005, obtaining the first sensing data associated with the projection surface, at operation S3010, obtaining the second projection image by performing the correction function on the first projection image based on the first sensing data, at operation S3015, identifying the position of the background area from the first projection image, at operation S3020, identifying the position of the blocking area corresponding to the position of the background area, at operation S3025, controlling the optical shutter part to perform the filtering function based on the position of the blocking area, at operation S3030, and outputting the second projection image through the projection part, at operation S3035.

The background area may be the second background area, and the obtaining the second projection image, at operation S3015, may include obtaining the color value of the first background area and the color value of the projection surface area based on the first sensing data, and performing the correction function on the first projection image based on a difference value of the color value of the first background area and the color value of the projection surface area.

The obtaining the second projection image, at operation S3015, may include identifying, based on the difference value being greater than or equal to the threshold value, the second background area from the first projection image, determining a color value of the second background area based on the color value of the first background area and the color value of the projection surface area, and obtaining the second projection image by performing the correction function based on the color value of the second background area.

The controlling method may further include performing the correction function a plurality of times.

The background area may be the second background area, and the obtaining the second projection image, at operation S3015, may include obtaining second sensing data associated with the projection surface, obtaining the illumination value of the first background area and the illumination value of the projection surface area based on the second sensing data, obtaining a difference value of the illumination value of the first background area and the illumination value of the projection surface area, identifying, based on the difference value being greater than or equal to the threshold value, the second background area from the first projection image, determining a brightness value of the second background area based on the illumination value of the first background area and the illumination value of the projection surface area, and obtaining the second projection image by performing the correction function based on the brightness value of the second background area.

The controlling the optical shutter part, at operation S3030, may include obtaining a transmittance corresponding to the blocking area, and controlling the optical shutter part to perform the filtering function based on the position and the blocking area and the transmittance.

The electronic apparatus 100 may store transmittance table information which includes the transmittance for each content type, and the controlling the optical shutter part, at operation S3030, may include identifying the content type of the first projection image, and obtaining the transmittance corresponding to the content type based on the transmittance table information.

The controlling method may further include obtaining third sensing data, changing, based on the background object being identified from the third sensing data, the position of the blocking area based on the position of the background object, and controlling the optical shutter part to perform the filtering function based on the changed position of the blocking area.

The controlling method may further include receiving content which includes the plurality of projection images and changing, based on the position of the background area being changed for each of the plurality of projection images, the position of the blocking area based on the changed position of the background area.

The obtaining the first sensing data, at operation S3010, may include obtaining the first sensing data which includes the captured image which captured the projection surface through the image sensor.

The methods according to the various embodiments of the disclosure described above may be implemented in an application form installable in the electronic apparatus 100 of the related art.

The methods according to the various embodiments of the disclosure described above may be implemented with only a software upgrade or a hardware upgrade of the electronic apparatus 100 of the related art.

The various embodiments of the disclosure described above may be performed through an embedded server provided in the electronic apparatus 100, or at least one external server from among the electronic apparatus 100 and a display apparatus.

According to an embodiment of the disclosure, the various embodiments described above may be implemented with software including instructions stored in a machine-readable storage media (e.g., computer). The machine may call a stored instruction from the storage medium, and as an apparatus operable according to the called instruction, may include the electronic apparatus 100 according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

According to an embodiment of the disclosure, a method according to the various embodiments described above may be provided included a computer program product. The computer program product may be exchanged between a seller and a purchaser as a commodity. The computer program product may be distributed in a form of a machine-readable storage medium (e.g., compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or memory of a relay server, or temporarily generated.

Each of the elements (e.g., a module or a program) according to the various embodiments described above may be formed as a single entity or a plurality of entities, and some sub elements from among the above-mentioned sub elements may be omitted, or other sub elements may be further included in the various embodiments. Alternatively or additionally, some elements (e.g., modules or programs) may be integrated into one entity to perform the same or similar functions performed by each of the relevant elements prior to integration. Operations performed by a module, a program, or another element, in accordance with the various embodiments, may be executed sequentially, in a parallel, repetitively, or in a heuristic manner, or at least some operations may be executed in a different order, omitted or a different operation may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from scope of the disclosure as defined by the appended claims and their equivalents.

What is claimed is:

1. An electronic apparatus, comprising:
memory storing one or more computer programs;
a projection part;
a sensor part;
an optical shutter part; and
one or more processors communicatively coupled to the memory, the projection part, the sensor part, and the optical shutter part,
wherein the one or more computer programs include computer-executable instructions that, when executed by the one or more processors individually or collectively, cause the electronic apparatus to:
output, through the projection part, a first projection image at a projection surface,
obtain, through the sensor part, first sensing data associated with the projection surface,
obtain a second projection image by performing a correction function on the first projection image based on the first sensing data, identify a position of a background area from the first projection image, identify a position of a blocking area corresponding to the position of the background area, control the optical shutter part to perform a filtering function based on the position of the blocking area, and output, through the projection part, the second projection image.

2. The electronic apparatus of claim 1, wherein the background area is a second background area, and wherein the one or more computer programs further include computer-executable instructions that, when executed by the one or more processors individually or collectively, cause the electronic apparatus to:

obtain a color value of a first background area and a color value of a projection surface area based on the first sensing data, and perform the correction function on the first projection image based on a difference value of the color value of the first background area and the color value of the projection surface area.

3. The electronic apparatus of claim 2, wherein the one or more computer programs further include computer-executable instructions that, when executed by the one or more processors individually or collectively, cause the electronic apparatus to:

based on the difference value being greater than or equal to a threshold value, identify the second background area from the first projection image, determine a color value of the second background area based on the color value of the first background area and the color value of the projection surface area, and obtain the second projection image by performing the correction function based on the color value of the second background area.

4. The electronic apparatus of claim 3, wherein the one or more computer programs further include computer-executable instructions that, when executed by the one or more processors individually or collectively, cause the electronic apparatus to:

perform the correction function a plurality of times.

5. The electronic apparatus of claim 1, wherein the background area is a second background area, and wherein the one or more computer programs further include computer-executable instructions that, when executed by the one or more processors individually or collectively, cause the electronic apparatus to:

obtain, through the sensor part, second sensing data associated with the projection surface, obtain an illumination value of a first background area and an illumination value of a projection surface area based on the second sensing data, obtain a difference value of the illumination value of the first background area and the illumination value of the projection surface area, based on the difference value being greater than or equal to a threshold value, identify the second background area from the first projection image, determine a brightness value of the second background area based on the illumination value of the first background area and the illumination value of the projection surface area, and obtain the second projection image by performing the correction function based on the brightness value of the second background area.

6. The electronic apparatus of claim 1, wherein the one or more computer programs further include computer-executable instructions that, when executed by the one or more processors individually or collectively, cause the electronic apparatus to:

obtain a transmittance corresponding to the blocking area, and control the optical shutter part to perform the filtering function based on the position of the blocking area and the transmittance.

7. The electronic apparatus of claim 6, wherein the one or more computer programs further include computer-executable instructions that, when executed by the one or more processors individually or collectively, cause the electronic apparatus to:

store, in the memory, transmittance table information comprising transmittance per content type, identify a content type of the first projection image, and obtain a transmittance corresponding to the content type based on the transmittance table information.

8. The electronic apparatus of claim 1, wherein the one or more computer programs further include computer-executable instructions that, when executed by the one or more processors individually or collectively, cause the electronic apparatus to:

obtain, through the sensor part, third sensing data, based on a background object being identified from the third sensing data, change the position of the blocking area based on a position of the background object, and control the optical shutter part to perform the filtering function based on a position of the changed blocking area.

9. The electronic apparatus of claim 1, wherein the one or more computer programs further include computer-executable instructions that, when executed by the one or more processors individually or collectively, cause the electronic apparatus to:

receive content comprising a plurality of projection images, and based on the position of the background area being changed for each of the plurality of projection images, change the position of the blocking area based on a position of the changed background area.

10. The electronic apparatus of claim 1, wherein the sensor part comprises an image sensor, and wherein the one or more computer programs further include computer-executable instructions that, when executed by the one or more processors individually or collectively, cause the electronic apparatus to:

obtain, through the image sensor, the first sensing data comprising a captured image capturing the projection surface.

11. A method performed by an electronic apparatus comprising a projection part and an optical shutter part, the method comprising:

outputting, by the electronic apparatus, a first projection image at a projection surface;

obtaining, by the electronic apparatus, first sensing data associated with the projection surface;

obtaining, by the electronic apparatus, a second projection image by performing a correction function on the first projection image based on the first sensing data;

identifying, by the electronic apparatus, a position of a background area from the first projection image;

identifying, by the electronic apparatus, a position of a blocking area corresponding to the position of the background area;

controlling, by the electronic apparatus, the optical shutter part to perform a filtering function based on the position of the blocking area; and outputting, by the electronic apparatus through the projection part, the second projection image.

12. The method of claim 11, wherein the background area is a second background area, and wherein the obtaining of the second projection image comprises:

obtaining, by the electronic apparatus, a color value of a first background area and a color value of a projection surface area based on the first sensing data; and performing, by the electronic apparatus, the correction function on the first projection image based on a difference value of the color value of the first background area and the color value of the projection surface area.

13. The method of claim 12, wherein the obtaining of the second projection image comprises:

based on the difference value being greater than or equal to a threshold value, identifying, by the electronic apparatus, the second background area from the first projection image;

determining, by the electronic apparatus, a color value of the second background area based on the color value of the first background area and the color value of the projection surface area; and obtaining, by the electronic apparatus, the second projection image by performing the correction function based on the color value of the second background area.

14. The method of claim 13, further comprising:

performing, by the electronic apparatus, the correction function a plurality of times.

15. The method of claim 11, wherein the background area is a second background area, and wherein the obtaining of the second projection image comprises:

obtaining, by the electronic apparatus, second sensing data associated with the projection surface;

obtaining, by the electronic apparatus, an illumination value of a first background area and an illumination value of a projection surface area based on the second sensing data;

obtaining, by the electronic apparatus, a difference value of the illumination value of the first background area and the illumination value of the projection surface area;

based on the difference value being greater than or equal to a threshold value, identifying, by the electronic apparatus, the second background area from the first projection image;

determining, by the electronic apparatus, a brightness value of the second background area based on the illumination value of the first background area and the illumination value of the projection surface area; and obtaining, by the electronic apparatus, the second projection image by performing the correction function based on the brightness value of the second background area.

16. The method of claim 11, further comprising:

obtaining, by the electronic apparatus, a transmittance corresponding to the blocking area; and controlling, by the electronic apparatus, the optical shutter part to perform the filtering function based on the position of the blocking area and the transmittance.

17. The method of claim 16, further comprising:

storing, by the electronic apparatus in memory of the electronic apparatus, transmittance table information comprising transmittance per content type;

identifying, by the electronic apparatus, a content type of the first projection image; and obtaining, by the electronic apparatus, a transmittance corresponding to the content type based on the transmittance table information.

18. The method of claim 17, wherein the content type is identified as being one of a viewing content type, a structured content type, an unstructured content type, multiple content type, or a background separated content type.

19. The method of claim 11, further comprising:

obtaining, by the electronic apparatus through a sensor part of the electronic apparatus, third sensing data;

based on a background object being identified from the third sensing data, changing, by the electronic apparatus, the position of the blocking area based on a position of the background object; and controlling, by the electronic apparatus, the optical shutter part to perform the filtering function based on a position of the changed blocking area.

20. The method of claim 11, wherein the filtering function comprises an operation of disposing the optical shutter part on a path through which the first projection image is output and controlling whether light is transmitted, and wherein the correction function comprises an operation of changing a color or brightness of the background area of the first projection image to a color or brightness of the projection surface.

* * * * *